(12) United States Patent
Hirata

(10) Patent No.: US 8,372,942 B2
(45) Date of Patent: Feb. 12, 2013

(54) POLYCARBONATE RESIN, COATING LIQUID CONTAINING SAME, AND ELECTROPHOTOGRAPHIC PHOTOSENSITIVE BODY

(75) Inventor: Kengo Hirata, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/143,656

(22) PCT Filed: Dec. 24, 2009

(86) PCT No.: PCT/JP2009/071449
§ 371 (c)(1),
(2), (4) Date: Aug. 4, 2011

(87) PCT Pub. No.: WO2010/079698
PCT Pub. Date: Jul. 15, 2010

(65) Prior Publication Data
US 2011/0287354 A1    Nov. 24, 2011

(30) Foreign Application Priority Data

Jan. 8, 2009  (JP) ................................ 2009-002703
May 1, 2009  (JP) ................................ 2009-112129

(51) Int. Cl.
*C08G 75/00*    (2006.01)
*C08G 63/00*    (2006.01)

(52) U.S. Cl. ........................... 528/172; 430/72; 524/611

(58) Field of Classification Search .................. 430/72; 524/611; 528/172
See application file for complete search history.

(56) References Cited

U.S. PATENT DOCUMENTS

| 5,239,039 A | 8/1993 | Markle |
| 2009/0018256 A1 | 1/2009 | Nefzger et al. |

FOREIGN PATENT DOCUMENTS

| JP | 63-186732 A | 8/1988 |
| JP | 3-249280 A | 11/1991 |
| JP | 8-248650 A | 9/1996 |
| JP | 3370326 B1 | 1/2003 |
| JP | 2009-24170 A | 2/2009 |

OTHER PUBLICATIONS

International Search Report of PCT/JP2009/071449 (Mar. 4, 2010).

*Primary Examiner* — Terressa Boykin
(74) *Attorney, Agent, or Firm* — Millen, White, Zelano & Branigan, P.C.

(57) ABSTRACT

Provided are: a urethane-based polycarbonate resin, including a repeating unit represented by the general formula [1], and a repeating unit represented by the general formula [2], in which the urethane-based polycarbonate resin has high wear resistance by virtue of a strong hydrogen bond between urethane groups; and an electrophotographic photoconductor, including a photosensitive layer provided on a conductive substrate, in which the electrophotographic photoconductor includes the above-mentioned polycarbonate resin as a component of the photosensitive layer, has high wear resistance, and maintains an excellent electrophotographic characteristic over a longtime period: [Chem. 1] ($Ar_2$ represents a group having a divalent aromatic group, and $Ar_1$ represents a divalent aromatic group-containing group having a specific structure).

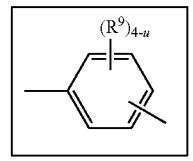

20 Claims, No Drawings

POLYCARBONATE RESIN, COATING LIQUID CONTAINING SAME, AND ELECTROPHOTOGRAPHIC PHOTOSENSITIVE BODY

TECHNICAL FIELD

The present invention relates to a urethane-copolymerized polycarbonate resin excellent in mechanical property, optical property, and electrophotographic characteristic, and an electrophotographic photoconductor containing the urethane-copolymerized polycarbonate resin as a binder resin in its photosensitive layer and excellent in durability.

BACKGROUND ART

A polycarbonate resin has been used as a material for molded articles in various industrial fields because the resin is excellent in mechanical property, thermal property, and electrical property. In recent years, the polycarbonate resin has been frequently used in the field of functional products, which utilize the optical property and the like as well as the above-mentioned characteristics of the resin. In association with such expansion of application fields, the variety of performance requested of the polycarbonate resin has also been increasing. Polycarbonate resins having various chemical structures have been proposed for meeting such request because a polycarbonate resin that has been conventionally used, the resin using, for example, 2,2-bis(4-hydroxyphenyl)propane or 1,1-bis(4-hydroxyphenyl)cyclohexane as a raw material, alone may be unable to meet such request sufficiently. However, a requested characteristic specific to each of various applications exists, and hence the development of a polycarbonate resin provided with performance that satisfies such request has been demanded.

An example of such functional products is an organic electrophotographic photoconductor obtained by forming, on a conductive substrate, a photosensitive layer using a polycarbonate resin as a binder resin for a charge generating material or for a charge transporting material.

The organic electrophotographic photoconductor is requested to have predetermined sensitivity, a predetermined electrical characteristic, or a predetermined optical characteristic in accordance with an electrophotographic process to which the organic electrophotographic photoconductor is applied. Operations such as corona charging, toner development, transfer onto paper, and a cleaning treatment are repeatedly conducted on the surface of the photosensitive layer of the electrophotographic photoconductor, and hence electrical and mechanical external forces are applied to the surface every time these operations are conducted. Therefore, the photosensitive layer provided for the surface of the electrophotographic photoconductor is requested to have durability against those external forces in order that the quality of electrophotographic images may be maintained over a long time period.

A polycarbonate resin using, for example, 2,2-bis(4-hydroxyphenyl)propane or 1,1-bis(4-hydroxyphenyl)cyclohexane as a raw material has been conventionally used as a binder resin for an electrophotographic photoconductor, but has not been sufficiently satisfactory in terms of durability. In view of the foregoing, various approaches have been adopted to meet such request. Copolymerization technologies have each been studied so far as an effective technology for improving the wear resistance of a photosensitive layer. Of those, a urethane group introduction method is a technology to which we have paid attention. The urethane group introduction method is a method involving introducing a —O—CO—NH— structure into a polycarbonate copolymer.

A urethane resin is fundamentally formed of a soft segment and a hard segment, and brings together flexibility, toughness, and elasticity by virtue of a balance between the hard segment strongly agglomerated by a strong hydrogen bond between urethane groups as its bonding units and the flexible soft segment. In the urethane resin, the hard segment is formed of a urethane group, and the soft segment is formed of a main chain structure except the urethane group. The inventor of the present invention has considered that high wear resistance is achieved simultaneously with mechanical strength as a feature of a polycarbonate resin by utilizing the foregoing characteristics because of the following reason. When a urethane bond is introduced into the polycarbonate resin, a three-dimensional network structure based on hydrogen bonds is formed, and hence a high-hardness crosslinked surface layer having an extremely high crosslink density is obtained.

However, a urethane-based polycarbonate resin disclosed in Patent Literature 1, which is obtained by copolymerizing an aliphatic diamine monomer and a bisphenol oligomer, has not shown wear resistance at least comparable to one enough to expect the resin to serve as a binder resin for an electrophotographic photoconductor despite the fact that the resin has the features of the hard and soft segments specific to the urethane resin. Although examples of the patent literature have reported aromatic urethane-based polycarbonate resins each obtained by copolymerizing a phenol monoamine monomer and a bisphenol oligomer as well, no significant effect on wear resistance has been observed.

Citation List
Patent Literature
[PTL 1] JP 08-248650 A

DISCLOSURE OF INVENTION

Problems to be Solved by the Invention

The present invention has been made under such circumstances, and an object of the present invention is to provide a urethane-based polycarbonate resin having high wear resistance by skillfully utilizing a strong hydrogen bond between urethane groups, and an electrophotographic photoconductor produced by using the polycarbonate resin, the electrophotographic photoconductor having high wear resistance and maintaining an excellent electrophotographic characteristic over a long time period. Another object of the present invention is to provide a coating liquid for an electrophotographic photoconductor for producing such electrophotographic photoconductor.

Means for Solving the Problems

The inventor of the present invention has made extensive studies to achieve the objects. As a result, the inventor has pinned down the fact that the following two conditions are essential to the discovery of a urethane-copolymerized polycarbonate resin excellent in wear resistance by skillfully utilizing a strong hydrogen bond between urethane groups: (1) both terminals of the main skeleton of a monomer unit (repeating unit) are urethane groups, and (2) the primary skeleton of each of the monomer unit and an oligomer unit (repeating unit) is a rigid aromatic system, specifically, the main chain of the resultant copolymer has an aromatic ring. Thus, the inventor has completed the present invention.

That is, the present invention provides the following.
(1) A polycarbonate resin, comprising:

a repeating unit represented by the following general formula [1]; and a repeating unit represented by the following general formula [2]:

[Chem. 1]

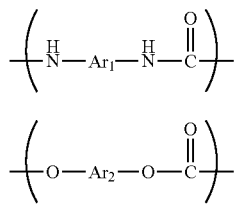

[1]

[2]

(in the formulae, $Ar_2$ represents a group having a divalent aromatic group, and $Ar_1$ represents a group represented by the following general formula [3]:

[Chem. 2]

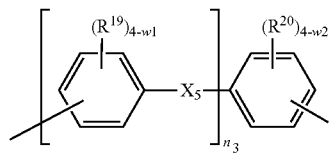

[3]

[in the formula, $X_5$ represents a single bond, —O—, —CO—, —S—, —SO—, —SO$_2$—, —CONH—, —CR$^{21}$R$^{22}$— (where $R^{21}$ and $R^{22}$ each independently represent a hydrogen atom, an alkyl group having 1 to 12 carbon atoms, a trifluoromethyl group, or a substituted or unsubstituted aryl group having 6 to 12 carbon atoms), —O—R$^{23}$—O— (where $R^{23}$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; $R^{19}$ and $R^{20}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; $w_1$ and $w_2$ each represent an integer of 0 to 4; the number $n_3$ of repeating units represents 0 to 5; $R^{19}$'s, $w_1$'s, and $X_5$'s in the repeating units are each capable of being selected for each repeating unit; and when an aromatic ring is substituted with two or more $R^{19}$'s or $R^{20}$'s ($w_1$ or $w_2 \leq 2$), $R^{19}$'s or $R^{20}$'s are capable of representing different substituents]).

(2) The polycarbonate resin according to the above-mentioned item (1), in which $Ar_2$ in the general formula [2] represents a group represented by the following general formula [4] and/or the following general formula [12]:

[Chem. 3]

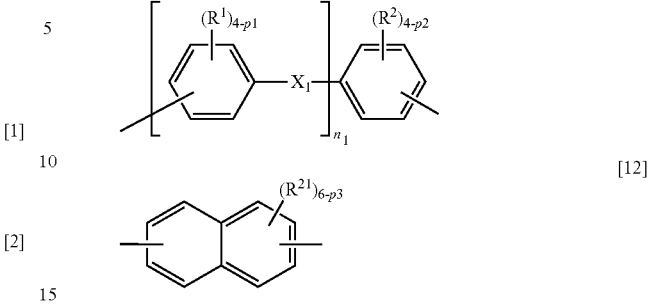

[4]

[12]

[in the formulae, $X_1$ represents a single bond, —O—, —CO—, —S—, —SO—, —SO$_2$—, —CONH—, —CR$^3$R$^4$— (where $R^3$ and $R^4$ each independently represent a hydrogen atom, an alkyl group having 1 to 12 carbon atoms, a trifluoromethyl group, or a substituted or unsubstituted aryl group having 6 to 12 carbon atoms), —O—R$^5$—O— (where $R^5$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; $R^1$, $R^2$, and $R^{21}$ each represent a halogen atom, a trifluoromethyl group, an alkyl group having 1 or 2 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; $p_1$ and $p_2$ each represent an integer of 0 to 4; $p_3$ represents an integer of 0 to 6; the number $n_1$ of repeating units represents 0 to 5; $R^1$'s, $p_1$'s, and $X_1$'s in the repeating units are each capable of being selected for each repeating unit; when an aromatic ring is substituted with two or more $R^1$'s or $R^2$'s ($p_1$ or $p_2 \leq 2$), $R^1$'s or $R^2$'s are capable of representing different substituents; and when an aromatic ring is substituted with two or more $R^{21}$'s ($p_3 \leq 4$), $R^{21}$'s are capable of representing different substituents].

(3) The polycarbonate resin according to the above-mentioned item (1), in which $Ar_2$ in the general formula [2] represents a group represented by any one of the following general formulae [5] to [7] and/or the following general formula [12]:

[Chem. 4]

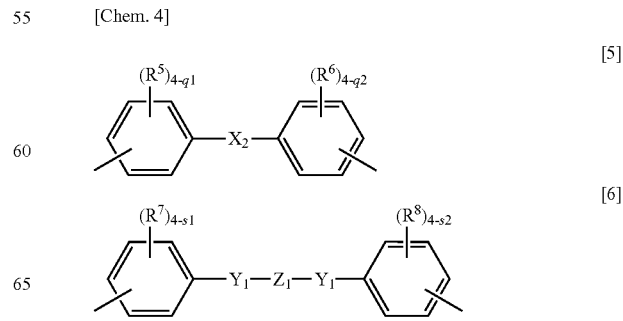

[5]

[6]

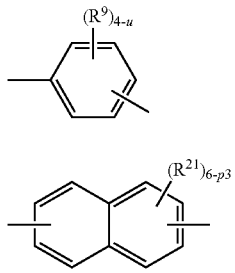

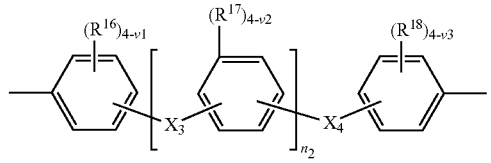

[in the formula (5), $X_2$ represents a single bond, —O—, —CO—, —S—, —SO—, —$SO_2$—, —CONH—, —$CR^{10}R^{11}$— (where $R^{10}$ and $R^{11}$ each independently represent a hydrogen atom, an alkyl group having 1 to 12 carbon atoms, a trifluoromethyl group, or a substituted or unsubstituted aryl group having 6 to 12 carbon atoms), —O—$R^{12}$—O— (where $R^{12}$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; in the formula [6], $Y_1$ represents a single bond, —O—, —CO—, —S—, —SO—, —$SO_2$—, —CONH—, —$CR^{13}R^{14}$— (where $R^{13}$ and $R^{14}$ each independently represent a hydrogen atom, an alkyl group having 1 to 12 carbon atoms, a trifluoromethyl group, or a substituted or unsubstituted aryl group having 6 to 12 carbon atoms), a substituted or unsubstituted cycloalkylidene group having 5 to 12 carbon atoms, or a substituted or unsubstituted adamantane-2,2-diyl or adamantane-1,3-diyl group; in the formulae [5] to [7], $R^5$ to $R^9$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, $q_1$ and $q_2$ each represent an integer of 0 to 4, $s_1$ and $s_2$ each represent an integer of 0 to 4, u represents an integer of 0 to 4, and when an aromatic ring is substituted with two or more $R^5$'s, $R^6$'s, $R^7$'s, $R^8$'s, or $R^9$'s ($q_1$, $q_2$, $s_1$, $s_2$, or $u \leq 2$), $R^5$'s, $R^6$'s, $R^7$'s, $R^8$'s, or $R^9$'s are capable of representing different substituents; in the formula [6], $Z_1$ is represented by the following general formula [6a] or [6b]:

[Chem. 5]

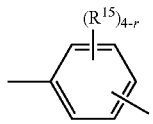

(in the formula [6b], $X_3$ and $X_4$ each represent a single bond, —O—, —CO—, —OC(=O)O—, —S—, —SO—, —$SO_2$—, —CONH—, —$CR^{19}R^{20}$— (where $R^{19}$ and $R^{20}$ each independently represent a hydrogen atom, an alkyl group having 1 to 12 carbon atoms, a trifluoromethyl group, or a substituted or unsubstituted aryl group having 6 to 12 carbon atoms), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; in the formula [6a] or [6b], $R^{15}$ to $R^{18}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, r represents an integer of 0 to 4, $v_1$, $v_2$, and $v_3$ each represent an integer of 0 to 4, the number $n_2$ of repeating units represents 0 to 2, $R^{17}$'s, $X_3$'s, and $v_2$'s in the repeating units are each capable of being selected for each repeating unit, and when an aromatic ring is substituted with two or more $R^{15}$'s, $R^{16}$'s, $R^{17}$'s, or $R^{18}$'s (r, $v_1$, $v_2$, or $v_3 \leq 2$), $R^{15}$'s, $R^{16}$'s, $R^{17}$'s, or $R^{18}$'s are capable of representing different substituents; in the formula [12], $R^{21}$ represents a halogen atom, a trifluoromethyl group, an alkyl group having 1 or 2 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, $p_3$ represents an integer of 0 to 6, and when an aromatic ring is substituted with two or more $R^{21}$'s ($p_3 \leq 4$), $R^{21}$'s are capable of representing different substituents].

(4) The polycarbonate resin according to any one of the above-mentioned items (1) to (3), in which $Ar_2$ in the general formula [2] represents an alkylidenebis(phenylene) group with or without a substituent having 1 to 4 carbon atoms, a cycloalkylidenebis(phenylene) group with or without a substituent having 5 or 6 carbon atoms, a substituted or unsubstituted adamantane-2,2-diylbis(phenylene) group, a substituted or unsubstituted adamantane-1,3-diylbis(phenylene) group, or a substituted or unsubstituted 1,3-phenylenebis[(methylethylidene)phenylene] group, and the groups may each have a substituent on an aromatic ring.

(5) The polycarbonate resin according to the above-mentioned item (4), in which: the substituent which the group represented by $Ar_2$ may have on the aromatic ring includes a chlorine atom or a methyl group; an alkylidene group of the alkylidenebis(phenylene) group with or without a substituent having 1 to 4 carbon atoms comprises a 1,1-diphenylmethylene group, a 1,1-ethylidene group, a 2,2-propylidene group, or a 2,2-hexafluoropropylidene group; and a cycloalkylidene group of the cycloalkylidenebis(phenylene) group with or without a substituent having 5 or 6 carbon atoms comprises a cyclohexylidene group or a 3,3,5-trimethyl-1,1-cyclohexylidene group.

(6) The polycarbonate resin according to any one of the above-mentioned items (1) to (5), in which $Ar_1$ in the general formula [1] represents a diphenylene ether group, a diphenylene sulfone group, a 9,9-bis(phenylene)fluorene group, an α,ω-alkylenebis(phenylene ether) group having 2 to 5 carbon atoms, a biphenylene group, an alkylidenebis(phenylene) group with or without a substituent having 1 to 4 carbon atoms, a cycloalkylidenebis(phenylene) group having 5 or 6 carbon atoms, a 2,2-propylidenebis(diphenylether)-p,p'-diyl group, or a phenylene group, and the groups may each have a substituent on an aromatic ring.

(7) The polycarbonate resin according to the above-mentioned item (6), in which: the substituent which the group represented by $Ar_1$ may have on the aromatic ring comprises a chlorine atom or a methyl group; an α,ω-alkylene group of the α,ω-alkylenebis(phenylene ether) group having 2 to 5 carbon atoms comprises an ethylene group, a trimethylene group, or a tetramethylene group; an alkylidene group of the alkylidenebis(phenylene) group with or without a substituent having 1 to 4 carbon atoms comprises a methylene group, a 2,2-propylidene group, or a 2,2-hexafluoropropylidene group; and a cycloalkylidene group of the cycloalkylidenebis (phenylene) group having 5 or 6 carbon atoms comprises a cyclohexylidene group.

(8) The polycarbonate resin according to anyone of the above-mentioned items (1) to (7), in which a molar ratio between the repeating unit represented by the general formula [1] and the repeating unit represented by the general formula [2] is 1:99 to 50:50.

(9) The polycarbonate resin according to any one of the above-mentioned items (1) to (8), in which the resin has a structure in which a part or entirety of a molecular terminal is sealed with a perfluoroalkyl group, a phenol containing a terminal hydrogen-substituted perfluoroalkyl group, a 1,1-dihydro-1-perfluoroalkyl alcohol, or a 1,1,ω-trihydro-1-perfluoroalkyl alcohol.

(10) A resin coating liquid, including the polycarbonate resin according to any one of the above-mentioned items (1) to (9).

(11) An electrophotographic photoconductor, comprises a photosensitive layer provided on a conductive substrate, in which the polycarbonate resin according to any one of the above-mentioned items (1) to (9) is incorporated as a component of the photosensitive layer.

Effects of the Invention

According to the present invention, there can be provided the urethane-based polycarbonate resin having high wear resistance, and there can be provided the electrophotographic photoconductor produced by using the urethane-based polycarbonate resin, the electrophotographic photoconductor having high wear resistance and maintaining an excellent electrophotographic characteristic over a long time period. Further, there can be provided the coating liquid for an electrophotographic photoconductor for producing such electrophotographic photoconductor.

BEST MODE FOR CARRYING OUT THE INVENTION

[Urethane-copolymerized Polycarbonate Resin]

The polycarbonate resin of the present invention is a urethane-copolymerized polycarbonate resin (which may hereinafter be referred to as "urethane-copolymerized PC"). The polycarbonate resin, includes: a repeating unit represented by the following general formula [1]; and a repeating unit represented by the following general formula [2].

[Chem. 6]

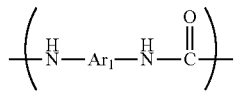

[1]

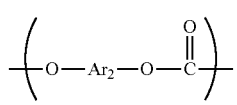

[2]

$Ar_2$ in the general formula [2] represents a group having a divalent aromatic group. On the other hand, $Ar_1$ in the general formula [1] represents a group represented by the following general formula [3].

[Chem. 7]

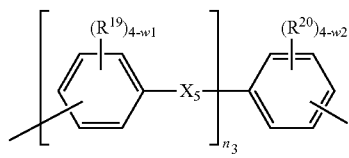

[3]

$X_5$ in the above-mentioned general formula [3] represents a single bond, —O—, —CO—, —S—, —SO—, —SO$_2$—, —CONH—, —CR$^{21}$R$^{22}$— (where R$^{21}$ and R$^{22}$ each independently represent a hydrogen atom, an alkyl group having 1 to 12 carbon atoms, a trifluoromethyl group, or a substituted or unsubstituted aryl group having 6 to 12 carbon atoms), —O—R$^{23}$—O— (where R$^{23}$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; R$^{19}$ and R$^{20}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; $w_1$ and $w_2$ each represent an integer of 0 to 4; the number $n_3$ of repeating units represents 0 to 5, and R$^{19}$'s, $w_1$'s, and $X_5$'s in the repeating units are each capable of being selected for each repeating unit; and when an aromatic ring is substituted with two or more R$^{19}$'s or R$^{20}$'s ($w_1$ or $w_2 \geq 2$), R$^{19}$'s or R$^{20}$'s are capable of representing different substituents.

Further, $Ar_2$ in the general formula [2] may represent a group represented by the following general formula [4] and/or the following general formula [12].

[Chem. 8]

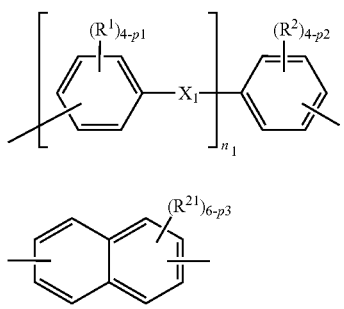

[4]

[12]

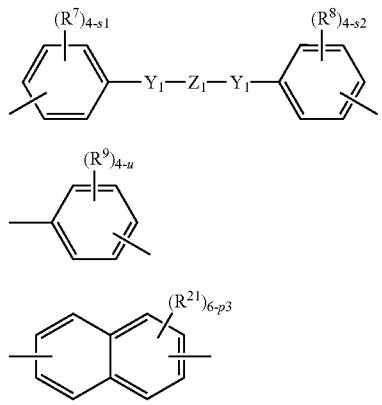

[6]

[7]

[12]

In the above-mentioned formula, $X_1$ represents a single bond, —O—, —CO—, —S—, —SO—, —SO$_2$—, —CONH—, —CR$^3$R$^4$— (where R$^3$ and R$^4$ each independently represent a hydrogen atom, an alkyl group having 1 to 12 carbon atoms, a trifluoromethyl group, or a substituted or unsubstituted aryl group having 6 to 12 carbon atoms), —O—R$^5$—O— (where R$^5$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; R$^1$, R$^2$, and R$^{21}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; $p_1$ and $p_2$ each represent an integer of 0 to 4; $p_3$ represents an integer of 0 to 6; the number $n_1$ of repeating units represents 0 to 5, and R$^1$'s, $p_1$'s, and $X_1$'s in the repeating units are each capable of being selected for each repeating unit; when an aromatic ring is substituted with two or more R$^1$'s or R$^2$'s ($p_1$ or $p_2 \leq 2$), R$^1$'s or R$^2$'s are capable of representing different substituents; and when an aromatic ring is substituted with two or more R$^{21}$'s ($p_3 \leq 4$) R$^{21}$'s are capable of representing different substituents.

In the general formula [4], $X_1$ preferably represents a single bond, —O—, —SO$_2$—, —CR$^3$R$^4$—, —O—R$^5$—O—, or a 9,9-fluorenylidene group, and $n_1$ preferably represents 1 to 3.

Further, $Ar_2$ in the general formula [2] may represent a group represented by any one of the following general formulae [5] to [7] and/or the following general formula [12].

[Chem. 9]

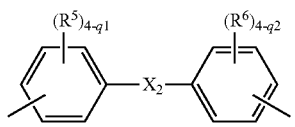

[5]

$X_2$ in the above-mentioned formula [5] may represent a single bond, —O—, —CO—, —S—, —SO—, —SO$_2$—, —CONH—, —CR$^{10}$R$^{11}$— (where R$^{10}$ and R$^{11}$ each independently represent a hydrogen atom, an alkyl group having 1 to 12 carbon atoms, a trifluoromethyl group, or a substituted or unsubstituted aryl group having 6 to 12 carbon atoms), —O—R$^{12}$—O— (where R$^{12}$ represents a carbonyl group, an alkyl chain having 1 to 6 carbon atoms, or a trifluoroalkyl chain, and may include a branched alkyl chain), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms.

From the viewpoint of wear resistance and hardness, $X_2$ in the above-mentioned formula [5] preferably represents a single bond, —O—, —SO$_2$—, —CR$^3$R$^4$—, a 9,9-fluorenylidene group.

Further, $Y_1$ in the above-mentioned formula [6] represents a single bond, —O—, —CO—, —S—, —SO—, —SO$_2$—, —CONH—, —CR$^{13}$R$^{14}$— (where R$^{13}$ and R$^{14}$ each independently represent a hydrogen atom, an alkyl group having 1 to 12 carbon atoms, a trifluoromethyl group, or a substituted or unsubstituted aryl group having 6 to 12 carbon atoms), a substituted or unsubstituted cycloalkylidene group having 5 to 12 carbon atoms, or a substituted or unsubstituted adamantane-2,2-diyl or adamantane-1,3-diyl group; R$^5$ to R$^9$ in the formulae [5] to [7] each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; $q_1$ and $q_2$ each represent an integer of 0 to 4; $s_1$ and $s_2$ each represent an integer of 0 to 4; u represents an integer of 0 to 4; when an aromatic ring is substituted with two or more R$^5$'s, R$^6$'s, R$^7$'s, R$^8$'s, or R$^9$'s ($q_1$, $q_2$, $s_1$, $s_2$, or $u \leq 2$), R$^5$'s, R$^6$'s, R$^7$'s, R$^8$'s, or R$^9$'s are capable of representing different substituents.

From the viewpoint of wear resistance, $Y_1$ in the above-mentioned formula [6] is preferably —O—.

$Z_1$ in the above-mentioned formula [6] may represent a group represented by the following formula [6a] or [6b].

[Chem. 10]

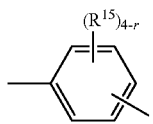
[6a]

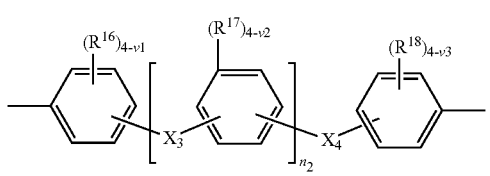
[6b]

$X_3$ and $X_4$ in the formula [6b] each represent a single bond, —O—, —CO—, —OC(=O)—, —S—, —SO—, —SO$_2$—, —CONH—, —CR$^{19}$R$^{20}$— (where R$^{19}$ and R$^{20}$ each independently represent a hydrogen atom, an alkyl group having 1 to 12 carbon atoms, a trifluoromethyl group, or a substituted or unsubstituted aryl group having 6 to 12 carbon atoms), a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms; R$^{15}$ to R$^{18}$ in the formula [6a] or [6b] each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms; r represents an integer of 0 to 4; $v_1$, $v_2$, and $v_3$ each represent an integer of 0 to 4; the number $n_2$ of repeating units represents 0 to 2, and R$^{17}$'s, $X_3$'s, and $v_2$'s in the repeating units are each capable of being selected for each repeating unit; when an aromatic ring is substituted with two or more R$^{15}$'s, R$^{16}$'s, R$^{17}$'s, or R$^{18}$'s (r, $v_1$, $v_2$, or $v_3$≦2), R$^{15}$'s, R$^{16}$'s, R$^{17}$'s, or R$^{18}$'s are capable of representing different substituents.

$Z_1$ in the above-mentioned formula [6] is preferably represented by the formula [6b] from the following viewpoint. A polycyclic unit structure is obtained, and hence the rigidity of the main chain is improved and an increase in hardness is achieved. $X_4$ preferably represents —O—, —CR$^{19}$R$^{20}$—, or a substituted or unsubstituted cycloalkylidene group having 5 to 12 carbon atoms in terms of wear resistance, and more preferably represents —CR$^{19}$R$^{20}$—. —CR$^{19}$R$^{20}$— is preferred from the following viewpoint. When a substituted or unsubstituted methylene group is interposed between aromatic rings, flexibility is imparted to the resin to reduce its brittleness. $n_2$ preferably represents 0 in terms of solubility.

In the formula [12], R$^{21}$ represents a halogen atom, a trifluoromethyl group, an alkyl group having 1 or 2 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, $p_3$ represents an integer of 0 to 6, and when an aromatic ring is substituted with two or more R$^{21}$'s ($p_3$≦4), R$^{21}$'s can represent different substituents.

When each group described above is a group having a substituent, as the substituent, there are given: halogen atoms such as fluorine, chlorine, bromine, and iodine; alkyl groups each having 1 to 12 carbon atoms such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, and a 2-methoxyethyl group; alkoxy groups each having 1 to 12 carbon atoms such as a methoxy group, an ethoxy group, an n-propoxy group, an isopropoxy group, an n-butoxy group, an isobutoxy group, a sec-butoxy group, a tert-butoxy group, various pentoxy groups, various heptoxy groups, and various octoxy groups; aryl groups each having 6 to 12 carbon atoms such as a phenyl group, a tolyl group, and a xylyl group; arylalkyl groups each having 7 to 20 carbon atoms such as a benzyl group, a phenethyl group, and a naphthylmethyl group; and the like.

It should be noted that in the present invention, the plurality of general formulae [1] may be incorporated, and the plurality of general formulae [2] may also be incorporated.

As described above, the urethane-copolymerized PC of the present invention is a urethane-copolymerized polycarbonate having a repeating unit represented by the general formula [1] and a repeating unit represented by the general formula [2] in which urethane groups are placed at both terminals of Ar$_1$, and the primary skeleton of each of the monomer and oligomer units is a rigid aromatic system.

Although the content of the monomer unit represented by the formula [1] in the copolymerized PC of the present invention is not particularly limited, a ratio of the unit to the entire polycarbonate copolymer is preferably 1 to 50 mol %, more preferably 3 to 30 mol %, still more preferably 5 to 18 mol % or 3 to 18 mol % in consideration of, for example, the physical properties of the copolymerized PC as a binder resin for an electrophotographic photoconductor, and the electrical characteristic (charging characteristic) and wear resistance of an electrophotographic photoconductor to be finally obtained. A molar fraction of the monomer unit of less than 1 mol % is not preferred because an effect of a hydrogen bond cannot be obtained owing to an insufficient number of urethane bonds and hence the wear resistance is not improved. A molar fraction of the monomer unit in excess of 50 mol % is not preferred either because solubility for a solvent at the time of the preparation of a polycarbonate coating liquid or solution stability reduces.

In addition, a solution of the urethane-copolymerized PC of the present invention in methylene chloride as a solvent having a concentration of 0.5 g/dl has a reduced viscosity [$\eta_{SP}$/C] at 20° C. of preferably 0.1 to 5 dl/g, more preferably 0.2 to 3 dl/g, particularly preferably 0.3 to 2.5 dl/g. A reduced viscosity [$\eta_{SP}$/C] of less than 0.1 dl/g is not preferred because the scratch resistance of the electrophotographic photoconductor may be insufficient. A reduced viscosity [$\eta_{SP}$/C] in excess of 5 dl/g is not preferred either because a coating viscosity becomes so high at the time of the production of the photoconductor that the productivity of the electrophotographic photoconductor may reduce.

[Method of Producing Urethane-copolymerized PC]

The urethane-copolymerized PC of the present invention can be produced by causing a carbonate formable compound to react with a mixed monomer of divalent amines represented by the following formula [8] and dihydric phenols represented by the following formula [4a] or [12a]. A reaction mode is, for example, the following mode. Phosgene or the like is used as the carbonate formable compound, and the following divalent amines [8] and the following dihydric phenols [4a] or [12a] are subjected to polycondensation in the presence of a proper acid binder.

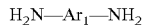

[8]

[In the formula, $Ar_1$ represents a group represented by the following general formula [9].]

[Chem. 11]

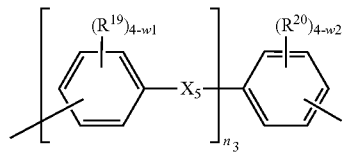

[9]

(In the formula, $X_5$, $R^{19}$, $R^{20}$, $w_1$, and $w_2$ each have the same meaning as that in the formula [3], and $n_3$ represents an integer of 0 to 5.)

[Chem. 12]

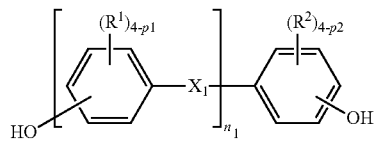

[4a]

(In the formula, $X_1$, $R^1$, $R^2$, $p_1$, and $p_2$ each have the same meaning as that in the formula [4], and $n_1$ represents an integer of 0 to 5.)

[Chem. 13]

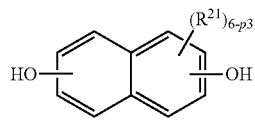

[12a]

(In the formula, $R^{21}$ and $p_3$ each have the same meaning as that in the formula [12].)

Specific examples of the divalent amine represented by the general formula [8] include 1,1-bis(4-aminophenyl)cyclohexane, α,α'-bis(4-aminophenyl)-1,4-diisopropylbenzene, 2,2-bis(4-aminophenyl)propane, 2,2-bis(4-aminophenyl)hexafluoropropane, 2,2-bis(3-aminophenyl)hexafluoropropane, 2,2-bis(3-amino-4-methylphenyl)hexafluoropropane, 2,2-bis(4-amino-3-methylphenyl)hexafluoropropane, 4,4'-diaminodiphenylether, 3,4'-diaminodiphenylether, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, 4,4'-bis(3-aminophenoxy)biphenyl, 2,2-bis{4-(4-aminophenoxy)phenyl}propane, 2,2-bis{4-(4-aminophenoxy)phenyl}hexafluoropropane, bis{4-(4-aminophenoxy)phenyl}sulfone, bis{4-(3-aminophenoxy)phenyl}sulfone, 4,4'-diamino-2,2'-bis(trifluoromethyl)diphenylether, bis{4-(4-aminophenoxy)phenyl}ketone, 1,4-bis(4-aminophenoxy)-2,3,5-trimethylbenzene, 1,4-bis(4-aminophenoxy)-2,5-di-t-butylbenzene, 1,4-bis{4-amino-2-(trifluoromethyl)phenoxy}benzene, 2,2-bis[4-{4-amino-2-(trifluoromethyl)phenoxy}phenyl]hexafluoropropane, 4,4'-diamino-2-(trifluoromethyl)diphenylether, 2,3'-diaminodiphenylether, bis(4-aminophenoxy)methane, 1,3-bis(4-aminophenoxy)propane, 1,4-bis(4-aminophenoxy)butane, 1,5-bis(4-aminophenoxy)pentane, 1,2-bis{2-(4-aminophenoxy)ethoxy}ethane, 1,3-bis(4-aminophenoxy)neopentane, 2,2-bis[4-(4-aminophenoxy)-3,5-dibromophenyl]hexafluoropropane, 2,5-bis(4-aminophenoxy)-biphenyl, 4,4'-diamino-3,3'-dichlorobiphenyl, 4,4'-diamino-3,3'-dimethoxybiphenyl, 4,4'-diamino-3,3'-dimethylbiphenyl, 4,4'-diamino-2,2'-dimethylbiphenyl, 4,4'-diamino-2,2'-dimethoxybiphenyl, 4,4'-diamino-2,2'-bis(trifluoromethyl)biphenyl, 4,4'-diamino-2,2',6,6'-tetrachlorobiphenyl, 4,4'-diamino-2,2'-dichlorobiphenyl, 4,4'-diamino-5,5'-dimethoxy-2,2'-dichlorobiphenyl, 4,4'-diaminodiphenylmethane, 3,3'-diaminodiphenylmethane, 3,4'-diaminodiphenylmethane, 4,4'-diamino-3,3'-dimethyldiphenylmethane, 4,4'-diamino-3,3'-dichlorodiphenylmethane, 9,9'-bis(4-aminophenyl)fluorene, 4,4'-diaminodiphenylketone, 3,3'-diaminodiphenylketone, 2,2-bis[4-{4-amino-2-(trifluoromethyl)phenoxy}phenyl]hexafluoropropane, 2,2-bis{4-(4-aminophenoxy)-3,5-dibromophenyl}hexafluoropropane, 4,4'-diaminodiphenylsulfone, 4,4'-diaminodiphenylsulfide, N-(4-aminophenyl)-4-aminobenzamide, N,N'-bis(4-aminophenyl)terephthalamide, 3,5-diaminobenzotrifluoride, 1,4-diaminobenzene, 1,3-diaminobenzene, 2,4-diaminotoluene, and 3,5-diaminotoluene. One kind of those amines may be used alone, or two or more kinds thereof may be used in combination.

Of those divalent amines, preferred are 1,1-bis(4-aminophenyl)cyclohexane, 4,4'-diaminodiphenylether, 9,9'-bis(4-aminophenyl)fluorene, 1,4-bis(4-aminophenoxy)butane, 4,4'-diamino-2,2'-dimethylbiphenyl, 4,4'-diamino-3,3'-dimethylbiphenyl, 4,4'-diamino-2,2'-bis(trifluoromethyl)biphenyl, 4,4'-diamino-3,3'-dimethyldiphenylmethane, 4,4'-diamino-3,3'-dichlorodiphenylmethane, 2,2-bis(4-aminophenyl)hexafluoropropane, 4,4'-diaminodiphenylsulfone, 2,2-bis{4-(4-aminophenoxy)phenyl}propane, and 1,4-diaminobenzene.

When a urethane-copolymerized PC produced using each of such divalent amines as a monomer is applied to an electrophotographic photosensitive body, wear hardly occurs even if friction is applied by paper or a blade for cleaning due to a pseudo-crosslink by a strong hydrogen bond in addition to a rigid primary skeleton. As a result, wear resistance is dramatically improved.

On the other hand, as the dihydric phenols represented by the general formula [4a], there are given a biphenol compound and a bisphenol compound. Specifically, as the biphenol compound, there are given 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol, 3,3'-dibutyl-4,4'-biphenol, and the like. Of those, 4,4'-biphenol is preferred in terms of the provision of a less colored urethane-copolymerized PC. Further, when 4,4'-biphenol is applied as a urethane-copolymerized PC for an electrophotographic photoconductor, durability is improved as well. One kind of those biphenol compounds may be used alone, or two or more kinds thereof may be used in combination.

Further, as the bisphenol compound, there are given 1,1-bis(3-methyl-4-hydroxyphenyl)ethane, 9,9-bis(3-phenyl-4-hydroxyphenyl)fluorene, bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)

heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 2,2-bis(3-methyl-4-hydroxyphenyl)propane, 2,2-bis(3-phenyl-4-hydroxyphenyl)propane, 2,2-bis(4-hydroxyphenyl)adamantane, 2,2-bis(3-methyl-4-hydroxyphenyl)adamantane, 1,3-bis(4-hydroxyphenyl)adamantane, 1,3-bis(3-methyl-4-hydroxyphenyl)adamantane, 2-(3-methyl-4-hydroxyphenyl)-2-(4-hydroxyphenyl)-1-phenylehtane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, 2,7-naphthalenediol, 2,6-naphthalenediol, 1,4-naphthalenediol, 1,5-naphthalenediol, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3,3'-difluoro-4,4'-dihydroxybiphenyl, 1,1-bis(3-cyclohexyl-4-hydroxyphenyl)cyclohexane, 2,2-bis(4-hydroxyphenyl)hexafluoropropane, 1,1-bis(3-phenyl-4-hydroxyphenyl)cyclohexane, bis(3-phenyl-4-hydroxyphenyl)sulfone, 4,4'-(3,3,5-trimethylcyclohexylidene)diphenol, 4,4'-[1,4-phenylenebis(1-methylethylidene)]bisphenol, 4,4'-[1,3-phenylenebis(1-methylethylidene)]bisphenol, 9,9-bis(4-hydroxyphenyl)fluorene, 9,9-bis(4-hydroxy-3-methylphenyl)fluorene, and the like. One kind of those bisphenol compounds may be used alone, or two or more kinds thereof may be used as a mixture.

Of those bisphenol compounds, preferred are, in terms of wear resistance or an increase in hardness, 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenylmethane, 1,1-bis(4-hydroxyphenyl)-1-phenylethane, bis(4-hydroxyphenyl)sulfone, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)cyclopentane, 2,2-bis(3-phenyl-4-hydroxyphenyl)propane, 4,4'-(3,3,5-trimethylcyclohexylidene)diphenol, 4,4'-[1,4-phenylenebis(1-methylethylidene)]bisphenol, 4,4'-[1,3-phenylenebis(1-methylethylidene)]bisphenol, 9,9-bis(4-hydroxyphenyl)fluorene, and 9,9-bis(4-hydroxy-3-methylphenyl)fluorene.

More preferred are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1-phenylethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)cyclopentane, 2,2-bis(3-phenyl-4-hydroxyphenyl)propane, 4,4'-(3,3,5-trimethylcyclohexylidene)diphenol, and 9,9-bis(4-hydroxy-3-methylphenyl)fluorene.

As the dihydric phenols represented by the general formula [12a], there are given 2,6-dihydroxynaphthalene, 2,7-dihydroxynaphthalene, 2,3-dihydroxynaphthalene, 1,4-dihydroxynaphthalene, 1,5-dihydroxynaphthalene, 1,6-dihydroxynaphthalene, 1,7-dihydroxynaphthalene, 1,2-dihydroxynaphthalene, 1,3-dihydroxynaphthalene, and the like.

Of those dihydric phenols, preferred are 2,6-dihydroxynaphthalene and 2,7-dihydroxynaphthalene in terms of wear resistance and availability of raw materials.

The urethane-copolymerized PC of the present invention is obtained by performing, for example, interfacial polycondensation with the monomer represented by the formula [8] and the monomer represented by the formula [4a] or [12a]. When the interfacial polycondensation is employed, a urethane bond and a carbonate bond can be suitably formed by, for example, performing the interfacial polycondensation with various dihalogenated carbonyls typified by phosgene, haloformates such as a chloroformate compound, or a carbonate compound in the presence of an acid binding agent. Any such reaction is performed in the presence of a terminal stopper and/or a branching agent, or a catalyst as required. Alternatively, the copolymerized PC of the present invention may be produced by using divalent amines and dihydric phenols in combination so as to be a tertiary copolymer.

As the terminal stopper, there can be used a monovalent carboxylic acid or a derivative thereof, a monohydric phenol, or the like. For example, suitably used are, in terms of the impartation of surface lubricity, p-tert-butyl-phenol, p-phenylphenol, p-cumylphenol, p-perfluorononylphenol, p-(perfluorononylphenyl)phenol, p-perfluorooctylphenol, p-perfluoroheptylphenol, p-perfluorohexylphenol, p-perfluoropentylphenol, p-perfluorobutylphenol, p-(perfluoroxylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafluoro-2-propanol, alcohols represented by the following formulae, and the like.

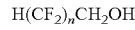

(n represents an integer of 1 to 12)

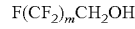

(m represents an integer of 1 to 12)

Preferred examples thereof include the polycarbonate resin having a structure in which a part or entirety of a molecular terminal is sealed with a perfluoroalkyl group, a phenol containing a terminal hydrogen-substituted perfluoroalkyl group, a 1,1-dihydro-1-perfluoroalkyl alcohol, or a 1,1,ω-trihydro-1-perfluoroalkyl alcohol.

Any such terminal stopper is added at a ratio of preferably 0.05 to 30 mol %, more preferably 0.1 to 10 mol % in terms of a copolymerization composition ratio. When the ratio exceeds 30 mol %, a reduction in mechanical strength may occur. When the ratio is less than 0.05 mol %, a reduction in moldability may occur.

Further, specific examples of the branching agent include fluoroglycine, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxindole, 5-chloroisatin, and 5,7-dichloroisatin, 5-bromoisatin.

Any such branching agent is added at a ratio of 30 mol % or less, preferably 5 mol % or less in terms of a copolymerization composition ratio. When the ratio exceeds 30 mol %, a reduction in moldability may occur.

When the interfacial polycondensation is performed, examples of the acid binding agent include: alkali metal hydroxides such as sodium hydroxide, potassium hydroxide, lithium hydroxide, and cesium hydroxide; alkaline earth metal hydroxides such as magnesium hydroxide and calcium hydroxide; weak acid salts of alkali metals and weak acid salts of alkaline earth metals such as sodium carbonate, potassium carbonate, and calcium acetate; and organic bases such as pyridine. Of those, the weak acid salts of alkali metals and the weak acid salts of alkaline earth metals such as sodium carbonate, potassium carbonate, and calcium acetate are preferred. In addition, those acid binding agents can be used as a mixture as well. The ratio at which the acid binding agent is used has only to be appropriately adjusted in consideration of the stoichiometric ratio (equivalent) of a reaction. Specifically, the acid binding agent has only to be used in an amount, or in excess, of 1 equivalent, preferably in an amount of 1 to 10 equivalents per 1 mol of the total of the amino groups of the divalent amine as a raw material and the hydroxyl groups of the dihydric phenol as another raw material.

When the urethane-copolymerized PC of the present invention is produced by the interfacial polycondensation, the use of a strong alkali compound such as potassium hydroxide or sodium hydroxide as an acid binding agent causes an active terminal of the polymer to be apt to deactivate. As a result, a termination reaction may proceed in preference to an elongation reaction, and hence there is a possibility that a molecular weight preferred for an electrophotographic photoconductor is not obtained. On the other hand, the use of a weak acid salt of an alkali metal or a weak acid salt of an alkaline earth metal such as sodium carbonate, potassium carbonate, or calcium acetate reduces the rate of the elongation reaction, but raises the difficulty with which the termination reaction occurs. As a result, an increase in molecular weight is achieved, and hence a urethane-copolymerized PC having a molecular weight preferred for an electrophotographic photoconductor is obtained.

A solvent to be used here is suitably, for example, an aromatic hydrocarbon such as toluene or xylene, a halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, or chlorobenzene, acetone, or acetophenone. One kind of those solvents may be used alone, or two or more kinds thereof may be used in combination. Further, an interfacial polycondensation reaction may be performed with two kinds of solvents that are immiscible with each other.

Further, as the catalyst, suitable are: tertiary amines such as trimethylamine, triethylamine, tributylamine, N,N-dimethylcyclohexylamine, pyridine, and dimethylaniline; quaternary ammonium salts such as trimethylbenzyl ammonium chloride, triethylbenzyl ammonium chloride, tributylbenzyl ammonium chloride, trioctylmethyl ammonium chloride, tetrabutyl ammonium chloride, and tetrabutyl ammonium bromide; quaternary phosphonium salts such as tetrabutyl phosphonium chloride and tetrabutyl phosphonium bromide; and the like.

In addition, as required, a small amount of an antioxidant such as sodium sulfite or a hydrosulfite salt may be added to the reaction system.

The method of producing the urethane-copolymerized PC can be specifically performed according to various modes. For example, the following method may be adopted. The bisphenol compound represented by the formula [4a] or [12a] and, for example, phosgene are caused to react with each other so that a polycarbonate oligomer may be produced. Then, the divalent amine represented by the above-mentioned formula [8] is caused to react with the polycarbonate oligomer in the presence of a mixed liquid of the solvent and an alkali aqueous solution of the acid binder. Alternatively, a method involving causing the dihydric phenol, the divalent amine, and phosgene to react with one another in the mixed liquid of the solvent and the alkali aqueous solution may be adopted. The former method involving producing the polycarbonate oligomer in advance is typically preferred because of its efficiency.

Upon production of the polycarbonate oligomer, an alkali aqueous solution of the dihydric phenol is prepared first by dissolving the dihydric phenol in an alkali aqueous solution. Next, phosgene is introduced into, and caused to react with, a mixed liquid of the alkali aqueous solution and an organic solvent such as methylene chloride so that the polycarbonate oligomer of the dihydric phenol may be synthesized. Next, the reaction solution is separated into an aqueous phase and an organic phase so that the organic phase containing the polycarbonate oligomer may be obtained. At this time, the alkali concentration of the alkali aqueous solution preferably falls within the range of 0.1 to 5 mol/L, and a volume ratio between the organic phase and the aqueous phase falls within the range of 10:1 to 1:10, preferably 5:1 to 1:5.

A reaction temperature is typically 0 to 70° C., preferably 5 to 65° C. under cooling, and a reaction time is about 15 minutes to 4 hours, preferably about 30 minutes to 3 hours. The polycarbonate oligomer thus obtained has an average molecular weight of 6,000 or less and a degree of polymerization of typically 20 or less, preferably 2 to 10.

The divalent amine monomer represented by the formula [8] is added to, and caused to react with, the organic phase containing the polycarbonate oligomer thus obtained. A reaction temperature is about 0 to 150° C., preferably 5 to 40° C., particularly preferably 10 to 25° C. Particularly when the reaction temperature is set to 25° C. or less, the decomposition of the urethane-copolymerized PC to be produced can be suppressed, and hence a molecular weight suitable for an electrophotographic photoconductor is obtained. On the other hand, a reaction temperature of 0° C. or less is not preferred because the rate of the elongation reaction is slow, and hence the polymerization requires a long time period.

Although a reaction pressure may be any one of reduced pressure, normal pressure, and increased pressure, the reaction can be suitably performed under normal pressure or about the self-pressure of a reaction system in ordinary cases.

A reaction time, which depends on the reaction temperature, is typically 0.5 minute to 10 hours, preferably about 1 minute to 2 hours.

The divalent amine monomer is desirably added in the form of an aqueous solution or a solution in an organic solvent in the reaction, that is, a reaction between the polycarbonate oligomer and the divalent amine monomer for the production of the urethane-copolymerized PC. Examples of the organic solvent include halogen-based hydrocarbons such as methylene chloride and ketones such as acetone. The order in which the monomer, the oligomer, and the like are added is not particularly limited. For example, the following method is given. After the divalent amine monomer and the terminal stopper have been loaded into a polymerization reaction vessel, the polycarbonate oligomer is loaded into the vessel, and then the acid binding agent and the catalyst are added to the mixture so that copolymerization may be performed. It should be noted that the catalyst, the terminal stopper, the branching agent, and the like can be added and used as required at one or both of the time of the production of the polycarbonate oligomer and the time of the subsequent molecular weight increase reaction, that is, the time of the production of the urethane-copolymerized PC in the above-mentioned production method.

The urethane-copolymerized PC thus obtained is a copolymer formed of the repeating unit represented by the general formula [1] and the repeating unit represented by the general formula [2].

In addition, the urethane-copolymerized PC may contain a polycarbonate unit having a structural unit except the formulae [1] and [2], or a unit having a polyester or polyether structure to such an extent that the achievement of the objects of the present invention is not inhibited.

It should be noted that the reduced viscosity $[\eta_{SP}/C]$ of the resultant urethane-copolymerized PC (value that correlates with a viscosity average molecular weight) can be set to fall within the range described in the foregoing by various methods such as the selection of the reaction conditions, and the regulation of the usages of the branching agent and a molecular weight modifier. Alternatively, in some cases, a urethane-copolymerized PC having a predetermined reduced viscosity $[\eta_{SP}/C]$ can be acquired by appropriately subjecting the resultant copolymerized PC to a physical treatment (such as mixing or fractionation) and/or a chemical treatment (such as a polymer reaction, a crosslinking treatment, or a partial decomposition treatment).

In addition, the resultant reaction product (coarse product) can be subjected to various post-treatments such as a known separation purification method so that a product having a desired purity (degree of purification) may be collected as a urethane-copolymerized PC.

Next, an electrophotographic photoconductor of the present invention is described.

[Electrophotographic Photoconductor]

The electrophotographic photoconductor of the present invention is an electrophotographic photoconductor having a photosensitive layer provided on a conductive substrate, the electrophotographic photoconductor being characterized in that the urethane-copolymerized polycarbonate resin of the present invention described in the foregoing is incorporated as a component of the photosensitive layer.

(Construction of Electrophotographic Photoconductor)

The electrophotographic photoconductor of the present invention may be any one of the electrophotographic photoconductor including known electrophotographic photoconductor of various types as long as the above-mentioned urethane-copolymerized PC is used in its photosensitive layer.

The electrophotographic photoconductor is preferably an organic electrophotographic photoconductor whose photosensitive layer has at least one charge generating layer and at least one charge transporting layer, or an organic electrophotographic photoconductor whose photosensitive layer has a charge generating substance and a charge transporting substance alone.

Although the urethane-copolymerized PC may be used in any portion in the photosensitive layer, the PC is desirably used as a binder resin for a charge moving substance in a charge transporting layer, as a binder resin for a single photosensitive layer having a charge generating substance and a charge transporting substance alone, or as a surface protective layer in order that an effect of the present invention may be sufficiently exerted. In the case of a multilayer electrophotographic photoconductor having two charge transporting layers, the PC is preferably used in one of the charge transporting layers.

In the electrophotographic photoconductor of the present invention, one kind of the urethane-copolymerized PCs of the present invention described in the foregoing may be used alone, or two or more kinds thereof may be used in combination. In addition, binder resin components such as other polycarbonates may each be incorporated as desired to such an extent that the objects of the present invention are not inhibited. Further, an additive such as an antioxidant may be incorporated.

<Photosensitive Layer>

The electrophotographic photoconductor of the present invention has the photosensitive layer on the conductive substrate. When the photosensitive layer has a charge generating layer and a charge transporting layer, the charge transporting layer may be laminated on the charge generating layer, or the charge generating layer may be laminated on the charge transporting layer. Alternatively, the photosensitive layer may simultaneously contain a charge generating substance and a charge transporting substance alone. Further alternatively, a conductive or insulative protective film may be formed on the surface layer as required. Further, for example, the photosensitive layer may be such that an intermediate layer such as an adhesive layer for improving adhesiveness between layers or a blocking layer that serves to block charge is formed.

<Material for Conductive Substrate>

A material for a conductive substrate to be used for the electrophotographic photosensitive body of the present invention is not particularly limited, and can be appropriately selected from conventionally known materials and the like and used. Specific examples of the material that can be used include: a plate, drum, or sheet composed of aluminum, nickel, chromium, palladium, titanium, molybdenum, indium, gold, platinum, silver, copper, zinc, brass, stainless steel, lead oxide, tin oxide, indium oxide, ITO (indium tin oxide: tin-doped indium oxide), or graphite; a glass, cloth, paper, or plastic film, sheet, or seamless belt subjected to a conductive treatment as a result of coating with a material by, for example, vapor deposition, sputtering, or application; and a metal drum subjected to a metal oxidation treatment by, for example, electrode oxidation.

<Charge Generating Layer>

The charge generating layer has at least a charge generating material, and the charge generating layer can be obtained by: forming a layer of the charge generating material on a substrate as a ground for the charge generating layer by a vacuum vapor deposition method or a sputtering method; or forming a layer obtained by binding the charge generating material onto a substrate as a ground for the charge generating layer with a binder resin. Any one of various methods such as known methods can be employed as a method of forming the charge generating layer involving the use of a binder resin; in ordinary cases, for example, a method involving applying an application liquid prepared by dispersing or dissolving the charge generating material and the binder resin in a proper solvent onto a substrate as a ground and drying the applied liquid to obtain a wet molded body is suitably employed.

Any one of various known materials can be used as the charge generating material in the charge generating layer. Specific compounds include: selenium elementary substances such as amorphous selenium and trigonal selenium; selenium alloys such as a selenium-tellurium alloy; selenium compounds or selenium-containing compositions such as $As_2Se_3$; inorganic materials each composed of elements belonging to Groups 12 and 16 such as zinc oxide and CdS—Se; oxide-based semiconductors such as titanium oxide; silicon-based materials such as amorphous silicon; metal-free phthalocyanine pigments such as τ-type metal-free phthalocyanine and χ-type metal-free phthalocyanine; metal phthalocyanine pigments such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine showing a strong diffraction peak at a Bragg angle 2θ in an X-ray diffraction pattern of 27.3±0.2°, and gallium phthalocyanine; a cyanine dye; an anthracene pigment; a bisazo pigment; a pyrene pigment; a polycyclic quinone pigment; a quinacridone pigment; an indigo pigment; a perylene pigment; a pyrylium dye; a squarylium pigment; an anthanthrone pigment; a benzimidazole pigment; an azo pigment; a thioindigo pigment; a quinoline pigment; a lake pigment; an oxazine pigment; a dioxazine pigment; a triphenylmethane pigment; an azlenium dye; a triarylmethane dye; a xanthine dye; a thiazine dye; a thiapyrylium dye; polyvinyl carbazole; and a bisbenzimidazole pigment. One kind of those compounds can be used alone as the charge generating substance, or two or more kinds thereof can be used in the form of a mixture as the charge generating substance. Of those charge generating substances, substances specifically described in JP 11-172003 A are suitable examples.

<<Binder Resin>>

The binder resin for the above charge generating layer described in the foregoing and the below-mentioned charge transporting layer is not particularly limited, and any one of various known resins can be used. Specific examples of the binder resin include polystyrene, polyvinylchloride, polyvinylacetate, a vinylchloride-vinylacetate copolymer, polyvinylacetal, an alkyd resin, an acryl resin, polyacrylonitrile, polycarbonate, polyurethane, an epoxy resin, a phenol resin, polyamide, polyketone, polyacrylamide, a butylal resin, a polyester resin, a vinylidenechloride-vinylchloride copolymer, a methacryl resin, a styrene-butadiene copolymer, a vinylidenechloride-acrylonitrile copolymer, a vinylchloride-vinylacetate-maleic anhydride copolymer, a silicone resin, a silicone-alkyd resin, a phenol-formaldehyde resin, a styrene-alkyd resin, a melamine resin, a polyether resin, a benzoguanamine resin, an epoxyacrylate resin, a urethaneacrylate resin, poly-N-vinylcarbazole resin, polyvinylbutylal, polyvinylformal, polysulfone, casein, gelatin, polyvinyl alcohol, ethylcellulose, nitrocellulose, carboxy-methyl cellulose, vinylidenechloride-based polymer latex, an acrylonitrile-butadiene copolymer, a vinyltoluene-styrene copolymer, a soybean oil-modified alkyd resin, nitrated polystyrene, polymethylstyrene, polyisoprene, polythiocarbonate, polyarylate, polyhaloarylate, polyallyl ether, polyvinylacrylate, and polyesteracrylate.

One kind of those resins can be used alone, or two or more kinds thereof can be used as a mixture. It should be noted that the urethane-copolymerized PC of the present invention or the butyral resin described in the foregoing is suitably used as a binder resin in the charge generating layer or charge transporting layer.

<Charge Transporting Layer>

The charge transporting layer can be obtained as a wet molded body by forming, on a substrate serving as a ground, a layer obtained by binding a charge transporting substance with the binder resin.

Although any one of the various known modes can be employed as a method of forming the charge transporting layer, the following method is suitable. A coating liquid prepared by dispersing or dissolving the charge transporting substance in a proper solvent together with the urethane-copolymerized PC of the present invention is applied onto a predetermined substrate serving as a ground, and is then dried so as to be obtained as a wet molded body. A compounding ratio between the charge transporting substance and the urethane-copolymerized PC to be used in the formation of the charge transporting layer is preferably 20:80 to 80:20, more preferably 30:70 to 70:30 in terms of a mass ratio.

Both excellent charge transporting property and excellent wear resistance are obtained in the preferred range.

In the charge transporting layer, one kind of the urethane-copolymerized PCs of the present invention can be used alone, or two or more kinds thereof can be used as a mixture. Alternatively, other binder resins can each be used in combination with the urethane-copolymerized PC of the present invention to such an extent that the objects of the present invention are not inhibited.

The thickness of the charge transporting layer thus formed is typically about 5 to 100 μm, preferably 10 to 30 μm. When the thickness is less than 5 μm, an initial potential may reduce. When the thickness exceeds 100 μm, a reduction in electrophotographic characteristic may occur.

<<<Charge Transporting Substance>>>

Any one of various known compounds can be used as a charge transporting substance that can be used together with the urethane-copolymerized PC of the present invention. Examples of those compounds each suitably used include a carbazole compound, an indole compound, an imidazole compound, an oxazole compound, a pyrazole compound, an oxadiazole compound, a pyrazoline compound, a thiadiazole compound, an aniline compound, a hydrazone compound, an aromatic amine compound, an aliphatic amine compound, a stilbene compound, a fluorenone compound, a butadiene compound, a quinone compound, a quinodimethane compound, a triazole compound, a triazole compound, an imidazolone compound, an imidazolidine compound, a bisimidazolidine compound, an oxazolone compound, a benzothiazole compound, a benzimidazole compound, a quinazoline compound, a benzofuran compound, an acridine compound, a phenazine compound, poly-N-vinylcarbazole, polyvinylpyrene, polyvinylanthracene, polyvinylacridine, poly-9-vinylphenylanthracene, a pyrene-formaldehyde resin, an ethylcarbazole resin, and a polymer having a structure of each compound at a main chain or a side chain. One kind of those compounds may be used alone, or two or more kinds thereof may be used.

Of those charge transporting substances, a compound specifically given in JP 11-172003 A is particularly suitably used.

It should be noted that the urethane-copolymerized PC of the present invention is suitably used as a binder resin in at least one of the charge generating layer and the charge transporting layer in the electrophotographic photoconductor of the present invention.

<Undercoat Layer>

In the electrophotographic photoconductor of the present invention, such an undercoat layer that is typically used can be provided between the conductive substrate and the photosensitive layer. As the undercoat layer, there can be used: fine particles of titanium oxide, aluminum oxide, zirconia, titanate, zirconate, lanthanum lead, black titanium, silica, lead titanate, barium titanate, tin oxide, indium oxide, or silicon oxide; or a component of a polyamide resin, a phenol resin, casein, a melamine resin, a benzoguanamine resin, a polyurethane resin, an epoxy resin, cellulose, nitrocellulose, polyvinylalcohol, or a polyvinylbutylal resin. In addition, the binder resin may be used as a resin for use in the undercoat layer, the urethane-copolymerized PC of the present invention may also be used as the resin. One kind of those fine particles and resins can be used alone, or various kinds thereof can be used as a mixture. When those fine particles and resins are used as a mixture, inorganic fine particles and a resin are suitably used in combination because a coating film having good smoothness can be formed.

The undercoat layer has a thickness of typically 0.01 to 10 μm, preferably 0.1 to 7 μm. When the thickness is less than 0.01 μm, the forming of the undercoat layer uniformly becomes difficult. In addition, when the thickness exceeds 10 μm, the electrophotographic characteristics of the electrophotographic photosensitive body may decrease.

<Blocking Layer>

In addition, such a known blocking layer that is typically used can be provided between the conductive substrate and the photosensitive layer. The same kind of a resin as that of the binder resin can be used in the blocking layer. Further, the urethane-copolymerized PC of the present invention may also be used. The blocking layer has a thickness of typically about 0.01 to 20 μm, preferably 0.1 to 10 μm. When the thickness is 0.01 μm or less, the forming of the blocking layer uniformly becomes difficult. In addition, when the thickness exceeds 20 μm, the electrophotographic characteristics of the electrophotographic photosensitive body may decrease.

<Protective Layer>

Further, a protective layer may be laminated on the photosensitive layer in the electrophotographic photoconductor of the present invention. The same kind of a resin as that of the binder resin can be used in the protective layer. In addition, the urethane-copolymerized PC of the present invention is particularly preferably used. The protective layer has a thickness of typically about 0.01 to 20 μm, preferably 0.1 to 10 μm. Further, the charge generating substance, the above charge transporting substance, an additive, resin fine particles, rubber fine particles, a metal or an oxide, nitride, salt, or alloy of the metal, carbon black, or a conductive material such as an organic conductive compound may be incorporated into the protective layer.

<<Appropriate Component in Each Layer>>

A binding agent, a plasticizer, a curing catalyst, a fluidity imparting agent, a pinhole controlling agent, or a spectral sensitizer (sensitizing dye) may be added to each of the charge generating layer and the charge transporting layer in order that the performance of the electrophotographic photoconductor may be improved. In addition, any one of the additives such as various chemical substances, antioxidants, surfactants, curl inhibitors, and leveling agents can be added to each of the layers with a view to preventing an increase in residual potential of the electrophotographic photosensitive body, and reductions in charged potential and sensitivity of the body due to the repeated use of the body.

Examples of the binder include a silicone resin, a polyamide resin, a polyurethane resin, a polyester resin, an epoxy resin, a polyketone resin, a polycarbonate resin, a polystyrene resin, a polymethacrylate resin, a polyacrylamide resin, a polybutadiene resin, a polyisoprene resin, a melamine resin, a benzoguanamine resin, a polychloroprene resin, a polyacrylonitrile resin, an ethylcellulose resin, a nitrocellulose resin, a urea resin, a phenol resin, a phenoxy resin, a polyvinylbutylal resin, a formal resin, a vinyl acetate resin, a vinyl acetate/vinyl chloride copolymer resin, and a polyester carbonate resin. In addition, a heat curable resin and/or a photocurable resin can also be used. Such resin is not particularly limited as long as the resin has electrical insulating property and can be formed into a coating film in an ordinary state, and the effect of the present invention is not impaired.

Specific examples of the plasticizer include biphenyl, biphenyl chloride, o-terphenyl, paraffin halide, dimethyl naphthalene, dimethyl phthalate, dibutyl phthalate, dioctyl phthalate, diethyleneglycol phthalate, triphenyl phosphate, diisobutyl adipate, dimethyl sebacate, dibutyl sebacate, butyl laurate, methylphtharylethyl glycolate, dimethylglycol phthalate, methyl naphthalene, benzophenone, polypropyrene, polystyrene, and fluoro hydrocarbon.

Specific examples of the curing catalyst include methanesulfonic acid, dodecylbenzenesulfonic acid, and dinonylnaphthalenedisulfonic acid. Specific examples of the fluidity imparting agent include a Modaflow (trade name, manufactured by Monsanto Company) and an Acronal 4F (trade name, manufactured by BASF Corporation). Specific examples of the pinhole controlling agent include benzoin and dimethyl phthalate. Each of the plasticizer, the curing catalyst, the fluidity imparting agent, and the pinhole controlling agent is preferably used at a content of 5 mass % or less with respect to the charge transporting layer.

In addition, when a sensitizing dye is used, suitable examples of the spectral sensitizer include: triphenylmethane-based dyes such as methyl violet, crystal violet, night blue, and Victoria blue; acridine dyes such as erythrosine, rhodamine B, rhodamine 3R, acridine orange, and flapeosine; thiazine dyes such as methylene blue and methylene green; oxazine dyes such as capri blue and Meldola's blue; cyanine dyes; merocyanine dyes; styryl dyes; pyrylium salt dyes; and thiopyrylium salt dyes.

An electron accepting substance can be added to the photosensitive layer for the purposes of, for example, improving the sensitivity of the layer, reducing the residual potential of the layer, and reducing the fatigue of the layer due to the repeated use of the layer. Specific examples of the electron accepting substance preferably include compounds having large electron affinity such as succinic anhydride, maleic anhydride, dibromomaleic andhydride, phthalic anhydride, tetrachlorophtahalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picrylchloride, quinonechlorimide, chloranil, bromanil, benzoquinone, 2,3-dichlorobenzoquinone, dichlorodicyano p-benzoquinone, naphthoquinone, diphenoquinone, tropoquinone, anthraquinone, 1-chloroanthraquinone, dinitroanthraquinone, 4-nitrobenzophenone, 4,4'-dinitrobenzophenone, 4-nitrobenzalmalondinitrile, α-cyano-β-(p- cyanophenyl)ethyl acrylate, 9-anthracenylmethylmalondinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylenemalononitrile), polynitro-9-fluorenylidene-(dicyanomethylenemalonodinitrile), picric acid, o-nitrobenzoate, p-nitrobenzoate, 3,5-dinitrobenzoate, pentafluorobennzoate, 5-nitrosalicyalate, 3,5-dinitrosalicylate, phthalic acid, and mellitic acid. Each of those compounds may be added to each of the charge generating layer and the charge transporting layer, and is added at a compounding ratio of typically about 0.01 to 200 parts by mass, preferably 0.1 to 50 parts by mass with respect to 100 parts by mass of the charge generating substance or the charge transporting substance.

In addition, a tetrafluoroethylene resin, a trifluorochloroethylene resin, a tetrafluoroethylene-hexafluoropropylene resin, a vinyl fluoride resin, a vinylidene fluoride resin, or a difluorodichloroethylene resin, or a copolymer of two or more thereof or a fluorine-based graft polymer of each thereof may be used for improving the surface property of the electrophotographic photoconductor. Such surface modifier is added at a compounding ratio of typically about 0.1 to 60 mass %, preferably 5 to 40 mass % with respect to the binder resin. When the compounding ratio is less than 0.1 mass %, a surface modifying effect such as an improvement in durability of the surface of the electrophotographic photoconductor or a reduction in surface energy of the surface is not sufficient. When the compounding ratio is more than 60 mass %, the electrophotographic characteristics of the electrophotographic photoconductor may decrease.

Preferred examples of the antioxidants include a hindered phenol-based antioxidant, an aromatic amine-based antioxidant, a hindered amine-based antioxidant, a sulfide-based antioxidant, and an organophosphorus antioxidant. Such antioxidant is added at a compounding ratio of typically 0.01 to 10 mass %, preferably 0.1 to 2 mass % with respect to the charge transporting substance.

Suitable specific examples of the antioxidants include compounds of the chemical formulae ([Chem. 94] to [Chem. 101]) described in the specification of JP 11-172003 A.

One kind of those antioxidants may be used alone, or two or more kinds thereof may be used as a mixture. In addition, each of those antioxidants may be added to each of the surface protective layer, the undercoat layer, and the blocking layer as well as the photosensitive layer.

<<Formation of Each Layer>>

Specific examples of the solvent to be used in the formation of each of the above charge generating layer and the charge transporting layer include: aromatic solvents such as benzene, toluene, xylene, and chlorobenzene; ketones such as acetone, methyl ethylketone, and cyclohexanone; alcohols such as methanol, ethanol, and isopropanol; esters such as ethyl acetate and ethyl cellosolve; halogenated hydrocarbons such as carbon tetrachloride, carbon tetrabromide, chloroform, dichloromethane, and tetrachloroethane; ethers such as tetrahydrofuran, dioxolane, and dioxane; dimethylformamide; dimethylsulfoxide; and diethylformamide. One kind of those solvents may be used alone, or two or more kinds thereof may be used as a mixed solvent.

The photosensitive layer of a monolayer electrophotographic photoconductor can be easily formed with the charge generating substance, the charge transporting substance, and the additive by applying the binder resin (urethane-copolymerized PC) of the present invention. In addition, the hole transportable substance and/or the electron transporting substance described in the foregoing are each/is preferably added as the charge transporting substance. A substance given in JP 2005-139339 A is preferably applicable as the electron transporting substance.

Applying of each layer can be performed by using any various known applicators. Specifically, applying can be performed by using, for example, an applicator, a spray coater, a bar coater, a chip coater, a roll coater, a dip coater, a doctor blade, a ring coater, and the like.

The photosensitive layer in the electrophotographic photoconductor has a thickness of typically about 5 to 100 μm, preferably 8 to 50 μm. When the thickness is less than 5 μm, the initial potential of the electrophotographic photoconductor is apt to below. When the thickness exceeds 100 μm, the electrophotographic characteristics of the electrophotographic photoconductor may decrease. A ratio between the charge generating substance and the binder resin to be used in the production of the electrophotographic photoconductor is typically 1:99 to 99:1, preferably 1:99 to 50:50 in terms of a mass ratio. In addition, a ratio between the charge transporting substance and the binder resin is typically about 10:90 to 80:20, preferably 30:70 to 70:30 in terms of a mass ratio.

[Coating Liquid]

A coating liquid of the present invention is obtained by dissolving or dispersing the urethane-copolymerized PC of the present invention in the solvent. In addition, the coating liquid may contain other components such as other resins, low-molecular weight compounds, various additives, colorants, fillers, fibers, and fine particles. For example, when the coating liquid is used in an electrophotographic photoconductor application, the liquid is produced by adding the charge transporting substance and the additive.

The above-mentioned PC of the present invention not only has good compatibility with the charge transporting substance but also undergoes neither whitening nor gelation even when dissolved in the solvent. Therefore, the resin coating liquid of the present invention containing the polymer, the charge transporting substance, and the solvent described above can be stably stored over a long time period without the occurrence of the whitening or gelation of the polymer component. In addition, when the photosensitive layer of an electrophotographic photoconductor is formed with the resin coating liquid, such an excellent electrophotographic photosensitive body that the photosensitive layer does not undergo crystallization and no defects in terms of image quality occur can be produced.

With regard to a ratio between the PC of the present invention and the solvent in the resin coating liquid of the present invention, it is desired that a ratio of the polymer to the total amount of the polymer and the solvent be typically 1 to 30 wt %, preferably 5 to 20 wt %. In addition, it is desired that a ratio between the polymer and the charge transporting substance in the resin coating liquid be typically 20:80 to 80:20, preferably 30:70 to 70:30 in terms of a weight ratio.

In the resin coating liquid of the present invention, one kind of the PCs of the present invention may be used alone, or two or more kinds thereof may be used in combination.

Examples of the above-mentioned solvent that can be suitably used include: aromatic solvents such as benzene, toluene, xylene, and chlorobenzene; ketones such as acetone, methyl ethyl ketone, and cyclohexanone; alcohols such as methanol, ethanol, and isopropanol; esters such as ethyl acetate and ethyl cellosolve; halogenated hydrocarbons such as carbon tetrachloride, chloroform, dichloromethane, and tetrachloroethane; ethers such as tetrahydrofuran and dioxane; dimethylformamide; dimethyl sulfoxide; and diethylformamide. Of those, more suitably used are halogenated hydrocarbons and ethers.

One kind of those solvents may be used alone, or two or more kinds thereof may be used as a mixed solvent.

In ordinary cases, the resin coating liquid of the present invention is suitably used in the formation of the charge transporting layer of a laminated electrophotographic photoconductor whose photosensitive layer includes at least a charge generating layer and the charge transporting layer. In addition, the above-mentioned resin coating liquid can be used in the formation of the photosensitive layer of a monolayer electrophotographic photoconductor by further incorporating the above-mentioned charge generating substance into the liquid.

(Application of Electrophotographic Photoconductor and Method of Using the Same)

The electrophotographic photoconductor of the present invention thus obtained uses the urethane-copolymerized PC of the present invention, and hence the coating liquid does not become cloudy and does cause gelation when the photosensitive layer is produced. In addition, the electrophotographic photoconductor contains a molded body (binder resin) formed of the urethane-copolymerized PC of the present invention in the photosensitive layer, and hence is excellent in durability (scratch resistance) and has an excellent electrical characteristic (charging characteristic). Accordingly, the electrophotographic photosensitive body of the present invention is a photosensitive body maintaining excellent electrophotographic characteristics for a long time period, and suitably finds use in a variety of electrophotographic fields such as copying machines (monochromatic, multi-color, or full-color; analog or digital copying machines), printers (laser, LED, or liquid crystal shutter printers), facsimiles, plate makers and devices each having a plurality of those functions.

It should be noted that, upon use of the electrophotographic photoconductor of the present invention, corona discharge (corotron or scorotron), contact charging (charging roll or charging brush), or the like is employed for charging. In addition, any one of a halogen lamp, a fluorescent lamp, laser (semiconductor laser or He—Ne laser), an LED, and a photoconductor internal exposure mode may be adopted for exposure. A dry developing mode such as cascade development, two-component magnetic brush development, one-component insulating toner development, or one-component conductive toner development, or a wet developing mode is employed for development. An electrostatic transferring method such as corona transfer, roller transfer, or belt transfer, a pressure transferring method, or an adhesive transferring method is employed for transfer. Heat roller fixing, radiant flash fixing, open fixing, pressure fixing, or the like is employed for fixing. Further, a brush cleaner, a magnetic brush cleaner, an antistatic brush cleaner, a magnetic roller cleaner, a blade cleaner, one skipping a cleaner or the like is used for cleaning and an antistatic treatment. In addition, a styrene-based resin, a styrene-acrylic copolymer resin, polyester, an epoxy resin, a polymer of a cyclic hydrocarbon, or the like is applicable as a resin for toner. The shape of the toner may be spherical or indeterminate, and the toner whose shape is controlled to a certain shape (such as a spheroidal shape or a potato shape) is also applicable. The toner may be any one of a pulverized toner, a suspension-polymerized toner, an emulsion-polymerized toner, a chemically granulated toner, and an ester-elongated toner.

EXAMPLES

Next, the present invention is described in more detail by way of examples, but the present invention is by no means limited by these examples.

Synthesis Example 1

Synthesis of Urethane-copolymerized Polycarbonate (PC-1)

While a solution prepared by dissolving 0.2 kg of 1,1-bis(4-hydroxyphenyl)cyclohexane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.5 mol/L, solid content=0.26 kg/L).

3.7 Grams of 4,4'-diaminodiphenyl ether were dissolved in 100 ml of methylene chloride, and then 0.038 g of p-tert-butylphenol as a molecular weight modifier was added to the solution. After that, 110 ml of the above-mentioned solution of the oligomer in methylene chloride and 43 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity $[\eta_{SP}/C]$ measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

Numbers provided for the following structural formula each represent a molar ratio.

In addition, numbers provided for the structural formulae of the polycarbonate resins of the respective synthesis examples to be descried later each also have the same meaning.

[Chem. 14]

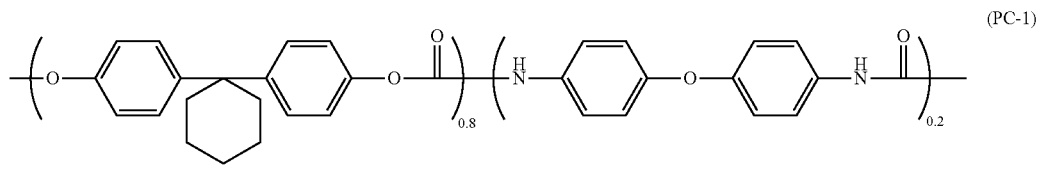

(PC-1)

Synthesis Example 2

Synthesis of Urethane-copolymerized Polycarbonate (PC-2)

While a solution prepared by dissolving 0.1 kg of 1,1-bis (4-hydroxyphenyl)cyclohexane and 0.1 kg of 1,1-bis(4-hydroxyphenyl)adamantane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate normality=0.5 N, solid content=0.26 kg/L).

3.7 Grams of 4,4'-diaminodiphenyl ether were dissolved in 100 ml of methylene chloride, and then 0.038 g of p-tert-butylphenol as a molecular weight modifier was added to the solution. After that, 110 ml of the above-mentioned solution of the oligomer in methylene chloride and 43 ml of an aqueous solution of potassium carbonate having a normal concentration of 2 were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a normal concentration of 0.01 once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity $[\eta_{SP}/C]$ measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR.$^{13}$C-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 15]

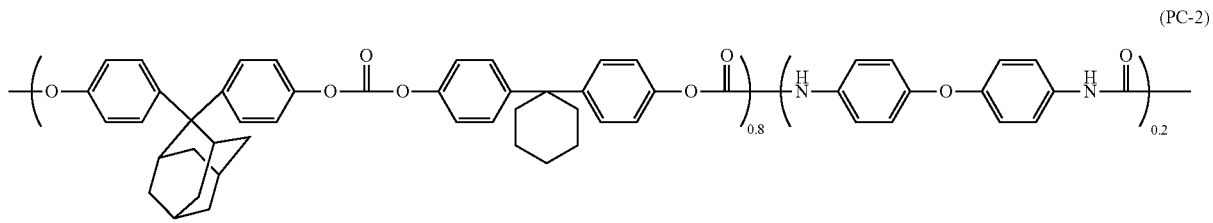

(PC-2)

Synthesis Example 3

Synthesis of Urethane-copolymerized Polycarbonate (PC-3)

While a solution prepared by dissolving 0.2 kg of 1,1-bis (4-hydroxyphenyl)cyclohexane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.5 mol/L, solid content=0.26 kg/L).

1.9 Grams of 4,4'-diaminodiphenyl ether were dissolved in 100 ml of methylene chloride, and then 0.038 g of p-tert-butylphenol as a molecular weight modifier was added to the solution. After that, 110 ml of the above-mentioned solution of the oligomer in methylene chloride and 43 ml of an aqueous solution of potassium carbonate having a concentration of 2 mol/L were mixed into the solution. Next, while the mixed liquid was vigorously stirred, 0.5 ml of an aqueous solution of triethylamine having a concentration of 7 mass % was added as a catalyst to the mixed liquid, and then the whole was subjected to a reaction at 22° C. under stirring for 10 minutes.

15 Milliliters of a 2N aqueous solution of sodium hydroxide in which 1.5 g of 2,7-dihydroxynaphthalene had been completely dissolved were added to the solution. After that, 0.5 mL of an aqueous solution of triethylamine (7 vol %) was added to the mixture while the mixture was stirred. Subsequently, the stirring was continued for 1 hour.

After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity $[\eta_{SP}/C]$ measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR.$^{13}$C-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

a degree of polymerization of 2 to 6 and having a chloroformate group at a molecular terminal thereof in methylene chloride was obtained in the organic layer (chloroformate molar concentration=0.8 mol/L, solid content=0.28 kg/L).

3.7 Grams of 1,4-diaminobenzene were dissolved in 100 ml of methylene chloride, and then 0.042 g of p-tert-butylphenol as a molecular weight modifier was added to the solution. After that, 110 ml of the above-mentioned solution of the oligomer in methylene chloride and 80 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity $[\eta_{SP}/C]$ measured at 20° C. (measurement was performed under the same condition in any one of the following examples as well) of 0.71 dl/g. The reduced viscosity was measured with an automatic viscosity-measuring apparatus VMR-052 USPC manufactured by RIGO CO., LTD. and an automatic Ubbelohde advanced viscometer for viscosity (RM model).

[Chem. 16]

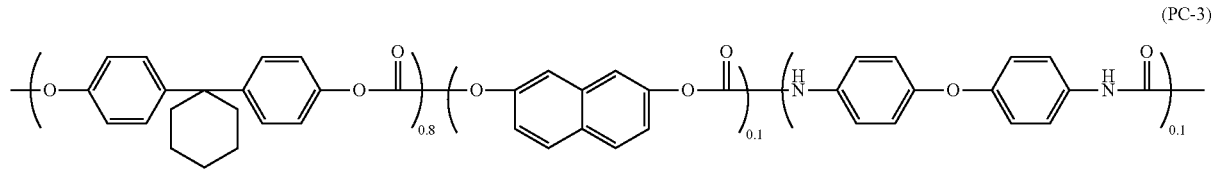

(PC-3)

Synthesis Example 4

Synthesis of Urethane-copolymerized Polycarbonate (PC-4)

While a solution prepared by dissolving 0.2 kg of 2,2-bis(4-hydroxyphenyl)propane in 1.3 kg of a 10-mass % aqueous solution of sodium hydroxide and 1.0 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 17]

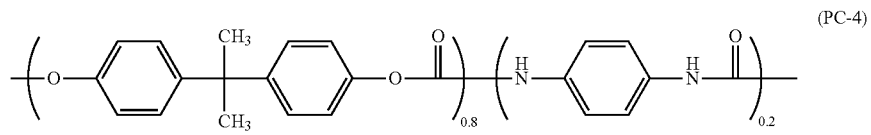

(PC-4)

Synthesis Example 5

Synthesis of Urethane-copolymerized Polycarbonate (PC-5)

A polycarbonate (PC-5) formed of the following structure [$\eta_{SP}/C=1.0$ dl/g] was obtained by the same operations as those of Synthesis Example 10 except that 3.7 g of 1,4-diaminobenzene were changed to 6.9 g of 4,4'-diaminodiphenyl ether in Synthesis Example 10.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

[Chem. 18]

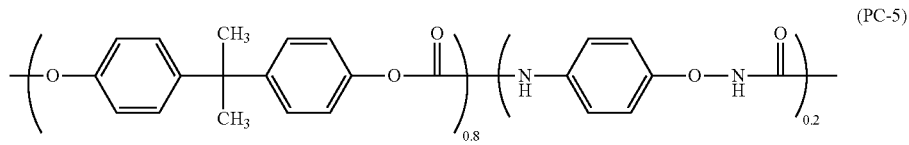

Synthesis Example 6

Synthesis of Urethane-copolymerized Polycarbonate (PC-6)

While a solution prepared by dissolving 0.2 kg of 1,1-bis(4-hydroxyphenyl)ethane in 1.2 kg of a 12-mass % aqueous solution of sodium hydroxide and 1.0 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.7 mol/L, solid content=0.26 kg/L).

5.7 Grams of 4,4'-diaminodiphenyl ether were dissolved in 100 ml of methylene chloride, and then 0.038 g of p-tert-butylphenol as a molecular weight modifier was added to the solution. After that, 110 ml of the above-mentioned solution of the oligomer in methylene chloride and 65 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 19]

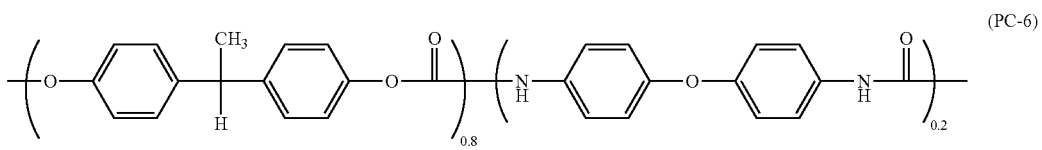

Synthesis Example 7

Synthesis of Urethane-copolymerized Polycarbonate (PC-7)

While a solution prepared by dissolving 0.2 kg of 2,2-bis(4-hydroxyphenyl)butane in 1.0 kg of a 12-mass % aqueous solution of sodium hydroxide and 1.0 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.8 mol/L, solid content=260 g/L).

6.5 Grams of 4,4'-diaminodiphenyl ether were dissolved in 100 ml of methylene chloride, and then 0.038 g of p-tert-butylphenol as a molecular weight modifier was added to the solution. After that, 110 ml of the above-mentioned solution of the oligomer in methylene chloride and 75 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

in methylene chloride was obtained in the organic layer (chloroformate molar concentration=0.8 mol/L, solid content=0.30 kg/L).

6.5 Grams of 4,4'-diaminodiphenyl ether were dissolved in 110 ml of methylene chloride, and then 0.044 g of p-tert-butylphenol as a molecular weight modifier was added to the solution. After that, 110 ml of the above-mentioned solution of the oligomer in methylene chloride and 75 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 20]

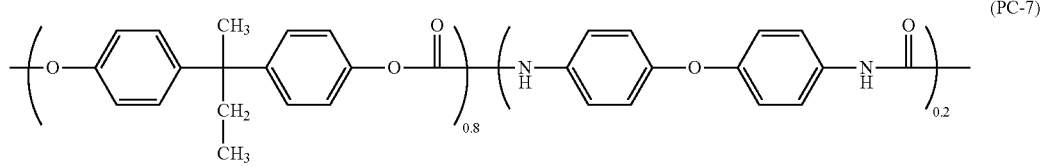

(PC-7)

Synthesis Example 8

Synthesis of Urethane-copolymerized Polycarbonate (PC-8)

While a solution prepared by dissolving 0.2 kg of 2,2-bis(3-methyl-4-hydroxyphenyl)propane in 1.2 kg of a 16-mass % aqueous solution of potassium hydroxide and 1.0 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof

[Chem. 21]

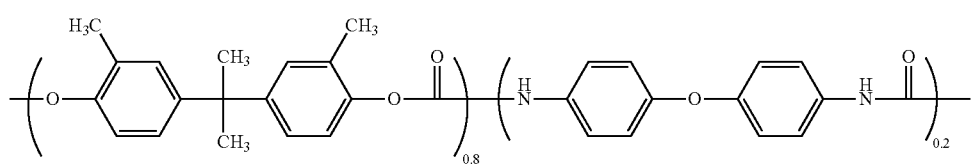

(PC-8)

Synthesis Example 9

Synthesis of Urethane-copolymerized Polycarbonate (PC-9)

While a solution prepared by dissolving 0.2 kg of 1,3-bis (2-(4-hydroxyphenyl)propyl)benzene in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.4 mol/L, solid content=0.26 kg/L).

3.3 Grams of 4,4'-diaminodiphenyl ether were dissolved in 110 ml of methylene chloride, and then 0.038 g of p-tert-butylphenol as a molecular weight modifier was added to the solution. After that, 110 ml of the above-mentioned solution of the oligomer in methylene chloride and 38 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 22]

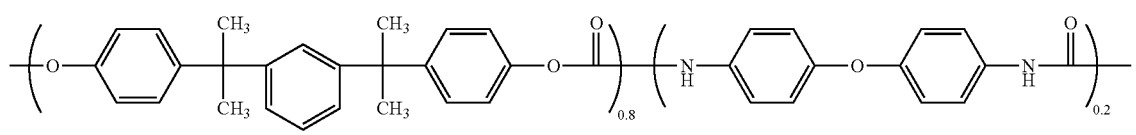

(PC-9)

Synthesis Example 10

Synthesis of Urethane-copolymerized Polycarbonate (PC-10)

While a solution prepared by dissolving 0.2 kg of 1,1-bis (4-hydroxyphenyl)-3,3,5-trimethyl-cyclohexane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.4 mol/L, solid content=0.26 kg/L).

3.3 Grams of 4,4'-diaminodiphenyl ether were dissolved in 110 ml of methylene chloride, and then 0.038 g of p-tert-butylphenol as a molecular weight modifier was added to the solution. After that, 110 ml of the above-mentioned solution of the oligomer in methylene chloride and 38 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

chloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 23]

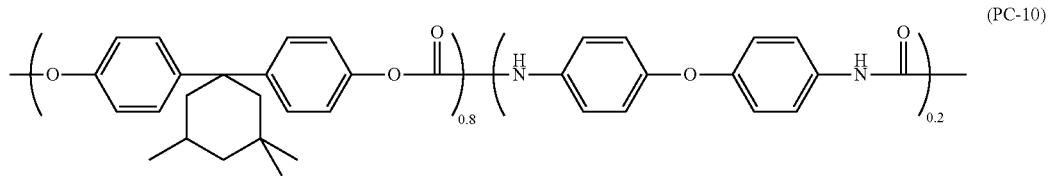

(PC-10)

Synthesis Example 11

Synthesis of Urethane-copolymerized Polycarbonate (PC-11)

While a solution prepared by dissolving 0.2 kg of bis(4-hydroxyphenyl)diphenylmethane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.34 mol/L, solid content=0.22 kg/L).

2.8 Grams of 4,4'-diaminodiphenyl ether were dissolved in 120 ml of methylene chloride, and then 0.038 g of p-tert-butylphenol as a molecular weight modifier was added to the solution. After that, 110 ml of the above-mentioned solution of the oligomer in methylene chloride and 38 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydro-

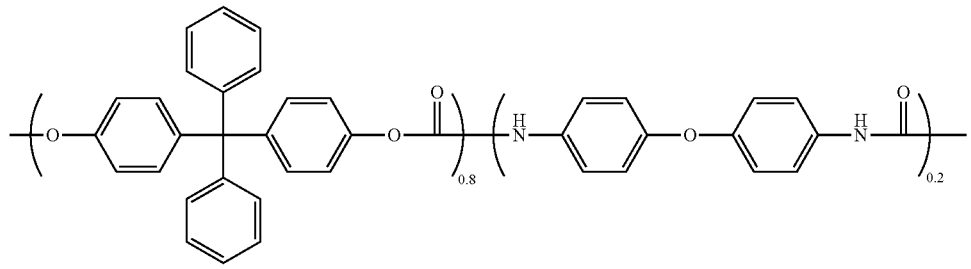

(PC-11)

Synthesis Example 12

Synthesis of Urethane-copolymerized Polycarbonate (PC-12)

While a solution prepared by dissolving 0.2 kg of 2,2-bis(4-hydroxyphenyl)hexafluoropropane in 1.2 kg of a 16-mass % aqueous solution of potassium hydroxide and 1.3 kg of methylene chloride were mixed and stirred, a phosgene gas was blown into the liquid under cooling at a ratio of 1 L/min until the pH of the liquid became 9 or less. Next, the reaction liquid was left at rest and separated. Thus, a solution of an oligomer having a degree of polymerization of 2 to 6 and having a chloroformate group at a molecular terminal thereof in methylene chloride was obtained in the organic layer (chloroformate molar concentration=0.34 mol/L, solid content=0.22 kg/L).

2.8 Grams of 4,4'-diaminodiphenyl ether were dissolved in 120 ml of methylene chloride, and then 0.038 g of p-tert-butylphenol as a molecular weight modifier was added to the solution. After that, 110 ml of the above-mentioned solution of the oligomer in methylene chloride and 38 ml of an aqueous solution of potassium carbonate having a concentration of 2 mol/L were mixed into the solution. Next, while the mixed liquid was vigorously stirred, 1 ml of an aqueous solution of triethylamine having a concentration of 7 mass % was added as a catalyst to the mixed liquid, and then the whole was subjected to a reaction at 22° C. under stirring for 1.5 hours. After the completion of the reaction, the reaction product was diluted with 300 ml of methylene chloride, and was then washed with 100 ml of water twice, 100 ml of hydrochloric acid having a concentration of 0.01 mol/L once, and 100 ml of water twice in the stated order. After that, the organic layer was charged into methanol and subjected to reprecipitation purification. Thus, a polycarbonate resin was obtained.

A solution of the polycarbonate resin thus obtained in methylene chloride as a solvent having a concentration of 0.5 g/dl had a reduced viscosity [$\eta_{SP}/C$] measured at 20° C. (measurement was performed under the same condition in any one of the following examples as well) of 1.0 dl/g. The reduced viscosity was measured with an automatic viscosity-measuring apparatus VMR-052 USPC manufactured by RIGO CO., LTD. and an automatic Ubbelohde advanced viscometer for viscosity (RM model).

The chemical structure and copolymerization composition of the resultant polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

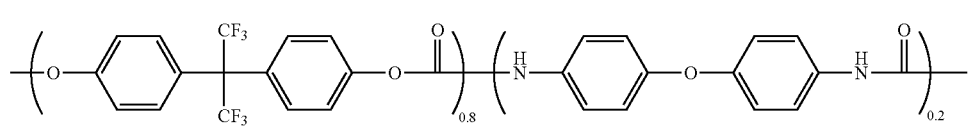

(PC-12)

Synthesis Example 13

Synthesis of Urethane-copolymerized Polycarbonate (PC-13)

A polycarbonate (PC-13) formed of the following structure [$\eta_{SP}/C$=1.0 dl/g] was obtained by the same operations as those of Synthesis Example 1 except that 3.7 g of 4,4'-diaminodiphenyl ether were changed to 4.5 g of 9,9-bis(4-aminophenyl)fluorene in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 26]

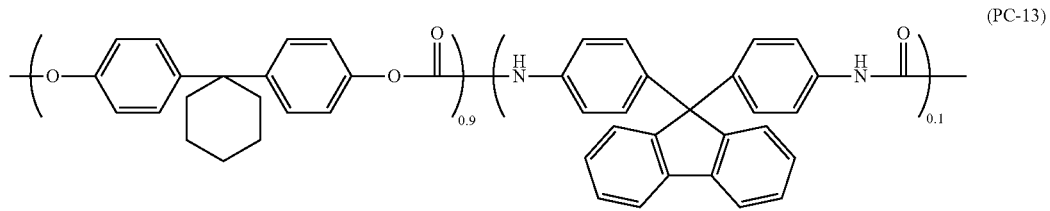

(PC-13)

Synthesis Example 14

Synthesis of Urethane-copolymerized Polycarbonate (PC-14)

A polycarbonate (PC-14) formed of the following structure [$\eta_{SP}/C=1.0$ dl/g] was obtained by the same operations as those of Synthesis Example 1 except that 3.7 g of 4,4'-diaminodiphenyl ether were changed to 5.0 g of 1,4-bis(4-aminophenoxy)butane in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

nodiphenyl ether were changed to 4.0 g of 4,4'-diamino-2,2'-dimethylbiphenyl in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 27]

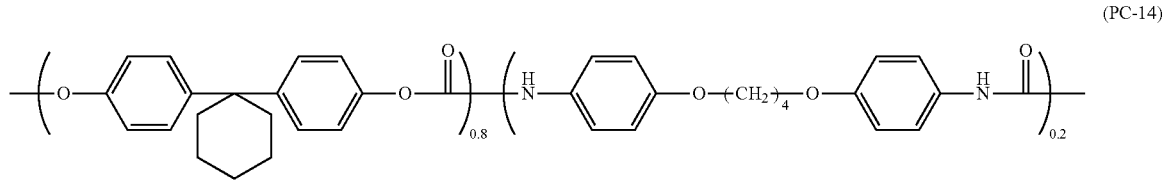

(PC-14)

Synthesis Example 15

Synthesis of Urethane-copolymerized Polycarbonate (PC-15)

A polycarbonate (PC-15) formed of the following structure [$\eta_{SP}/C=1.0$ dl/g] was obtained by the same operations as those of Synthesis Example 1 except that 3.7 g of 4,4'-diami-

[Chem. 28]

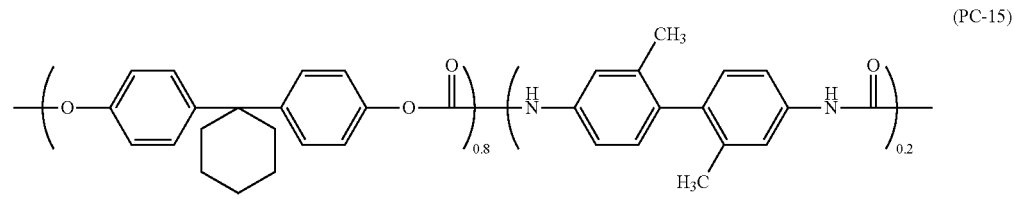

(PC-15)

Synthesis Example 16

Synthesis of Urethane-copolymerized Polycarbonate (PC-16)

A polycarbonate (PC-16) formed of the following structure [$\eta_{SP}/C=1.0$ dl/g] was obtained by the same operations as those of Synthesis Example 1 except that 3.7 g of 4,4'-diaminodiphenyl ether were changed to 5.0 g of 4,4'-diamino-3,3'-dichlorodiphenyl methane in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

Synthesis Example 18

Synthesis of Urethane-copolymerized Polycarbonate (PC-18)

A polycarbonate (PC-18) formed of the following structure [$\eta_{SP}/C=1.0$ dl/g] was obtained by the same operations as those of Synthesis Example 1 except that 3.7 g of 4,4'-diaminodiphenyl ether were changed to 4.7 g of 4,4'-diaminodiphenylsulfone in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 29]

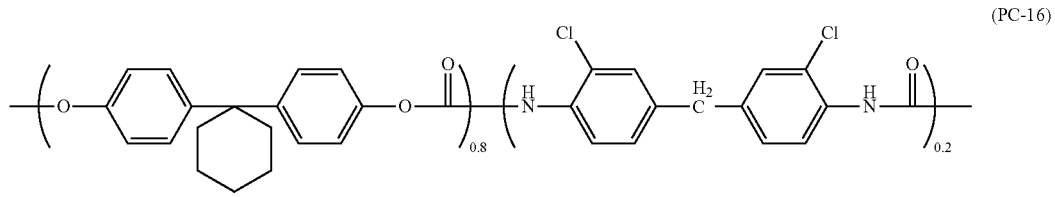

(PC-16)

Synthesis Example 17

Synthesis of Urethane-copolymerized Polycarbonate (PC-17)

A polycarbonate (PC-17) formed of the following structure [$\eta_{SP}/C=1.0$ dl/g] was obtained by the same operations as those of Synthesis Example 1 except that 3.7 g of 4,4'-diaminodiphenyl ether were changed to 6.3 g of 2,2-bis(4-aminophenyl)hexafluoropropane in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 30]

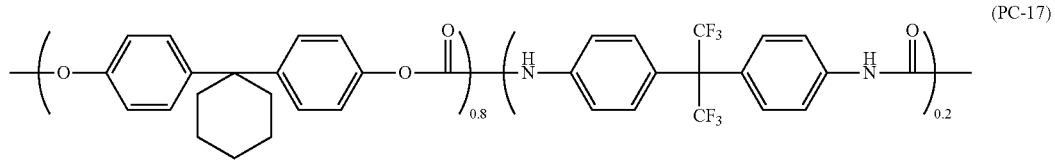

(PC-17)

[Chem. 31]

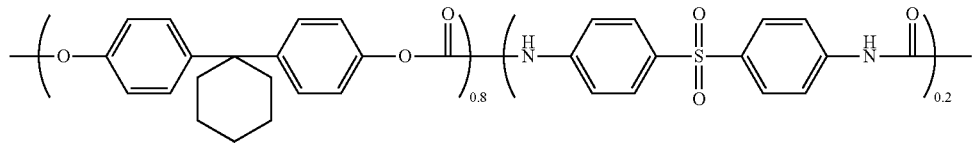

Synthesis Example 19

Synthesis of Urethane-copolymerized Polycarbonate (PC-19)

A polycarbonate (PC-19) formed of the following structure [$\eta_{SP}/C=0.8$ dl/g] was obtained by the same operations as those of Synthesis Example 1 except that 3.7 g of 4,4'-diaminodiphenyl ether were changed to 4.7 g of 1,1-bis(4-aminophenyl)cyclohexane in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin had the following structure and composition.

[Chem. 32]

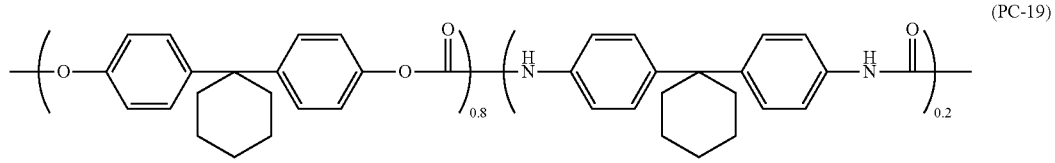

Synthesis Example 20

Synthesis of Urethane-copolymerized Polycarbonate (PC-20)

A polycarbonate (PC-20) formed of the following structure [$\eta_{SP}/C=1.0$ dl/g] was obtained by the same operations as those of Synthesis Example 1 except that 3.7 g of 4,4'-diami-

[Chem. 33]

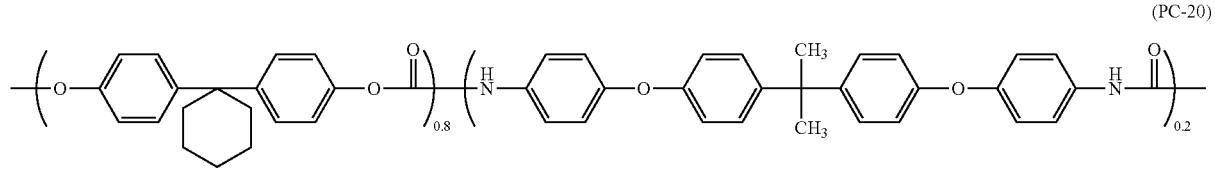

nodiphenyl ether were changed to 7.6 g of 2,2'-bis{4-(4-aminophenoxy)phenyl}propane in Synthesis Example 1.

The chemical structure and copolymerization composition of the polycarbonate resin were determined by $^1$H-NMR analysis. In addition, the results of the IR spectral analysis of the resultant polycarbonate resin showed that absorption by a

Synthesis Example 21

Synthesis of Urethane-copolymerized Polycarbonate (PC-21)

A terminal-modified product of a polycarbonate having the same structure as that of the above-mentioned PC-1 [$\eta_{SP}/C=1.0$ dl/g] was obtained by the same operations as those of Synthesis Example 1 except that 0.038 g of p-tert-butylphenol as a molecular weight modifier was changed to 0.13 g of p-perfluorooctylphenol in Synthesis Example 1.

$^1$H-NMR analysis confirmed that a terminal structure was sealed with p-perfluorooctylphenol. In addition, the results of the IR spectral analysis of the resultant polycarbonate resin showed that absorption by a carbonate group and absorption by a urethane group were observed at 1775 cm$^{-1}$ and 1755 cm$^{-1}$, respectively, and hence the resin had a carbonate bond and a urethane bond. All of those results of analysis confirmed that the resultant polycarbonate resin was a p-perfluorooctylphenol terminal-modified structure of the above-mentioned PC-1.

Example 1

An electrophotographic photoconductor was produced with the PC-4 by the following method, and was then evaluated for its performance.

An electrophotographic photoconductor was produced by sequentially laminating a charge generating layer and a charge transporting layer on the surface of a polyethylene terephthalate resin film onto which an aluminum metal had been deposited from the vapor, the film being used as a conductive substrate, to form a laminated photosensitive layer.

0.5 part by mass of oxotitanium phthalocyanine was used as a charge generating substance, and 0.5 part by mass of a butyral resin was used as a binder resin. The charge generating substance and the binder resin were added to, and dispersed with a ball mill in, 19 parts by mass of methylene chloride as a solvent. The dispersion was applied to the surface of the above-mentioned conductive substrate film with a bar coater, and was dried, whereby a charge generating layer having a thickness of about 0.5 μm was formed.

Next, 1.0 g of the following compound (CTM-1) and 1.0 g of the above-mentioned copolymerized polycarbonate resin (PC-4) were dissolved in 11 ml of tetrahydrofuran, whereby a coating liquid was prepared. The coating liquid was applied onto the above-mentioned charge generating layer with an applicator, and was dried, whereby a charge transporting layer having a thickness of about 20 μm was formed.

[Chem. 34]

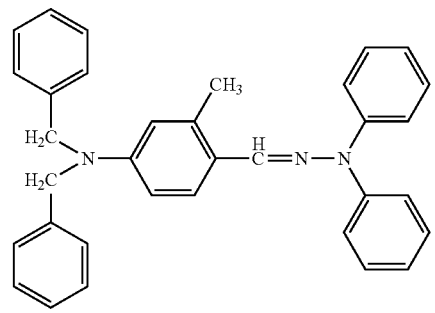

(CTM-1)

Next, the electrophotographic characteristics of the electrophotographic photoconductor were measured with a static electricity charging testing device "EPA-8100" (manufactured by Kawaguchi Electric Works Co., Ltd.). Corona discharge at −6 kV was performed, the initial surface potential ($V_O$), residual potential ($V_R$) after irradiation with light (10 Lux) for 5 seconds, and half decay exposure ($E_{1/2}$) of the electrophotographic photoconductor were measured. Further, the wear resistance of the charge transporting layer was evaluated by using a SUGA abrasion testing machine "NUS-ISO-3 type" (manufactured by SUGA TEST INSTRUMENTS). The test was performed under the following conditions. That is, abrasive paper (containing alumina particles each having a particle diameter of 3 μm) to which a load of 4.9 N was applied was brought into contact with the surface of the photosensitive layer, and was reciprocated 2,000 times, and an amount of mass decrease was measured. Table 1 shows the results.

Comparative Example 1

An electrophotographic photoconductor was produced in the same manner as in Example 1 with an aliphatic urethane-copolymerized polycarbonate resin (PC-C1) described in JP 08-248650 A (Examples) (reduced viscosity: 0.55 dl/g), and then its initial potential ($V_O$), residual potential ($V_R$) after irradiation with light for 5 seconds, half decay exposure ($E_{1/2}$), and amount in which its charge transporting layer reduced owing to wear were measured by the same methods. Table 1 shows the results.

[Chem. 35]

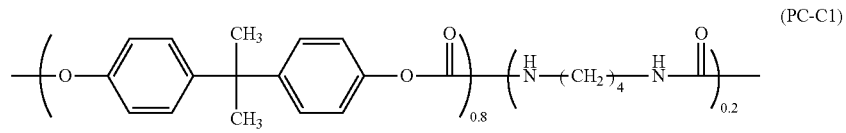

(PC-C1)

Comparative Example 2

An electrophotographic photoconductor was produced in the same manner as in Example 1 with an aromatic urethane-copolymerized polycarbonate resin (PC-C2) described in JP 08-248650 A (Examples) (reduced viscosity: 0.71 dl/g), and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 1 shows the results.

[Chem. 36]

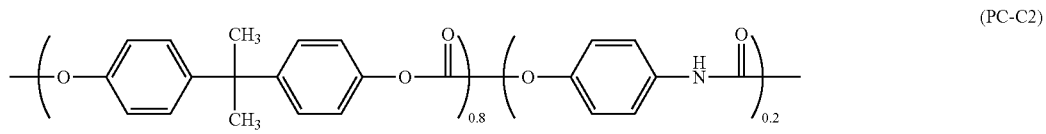

[Chem. 37]

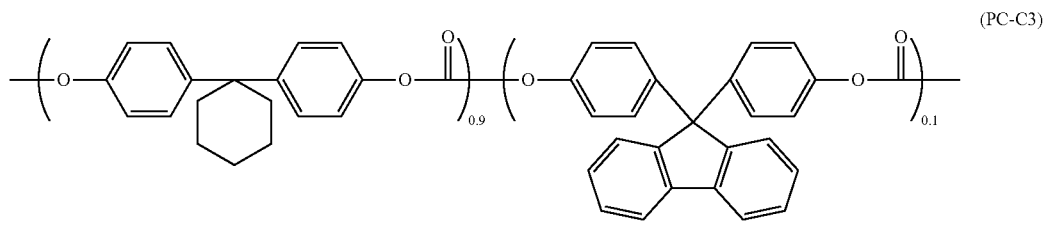

Example 1 using the urethane-copolymerized PC of the present invention showed a marked improvement in wear resistance as compared with the electrophotographic photoconductors using the aliphatic urethane-copolymerized PC resin used in Comparative Example 1 and the aromatic urethane-copolymerized PC resin having a urethane bond on only one of the aromatic groups used in Comparative Example 2.

Example 2

An electrophotographic photoconductor was produced in the same manner as in Example 1 except that the PC-1 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 3

An electrophotographic photoconductor was produced in the same manner as in Example 1 except that the PC-2 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 4

An electrophotographic photoconductor was produced in the same manner as in Example 1 except that the PC-3 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 5

An electrophotographic photoconductor was produced in the same manner as in Example 1 except that the PC-5 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 6

An electrophotographic photoconductor was produced in the same manner as in Example 1 except that the PC-6 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 7

An electrophotographic photoconductor was produced in the same manner as in Example 1 except that the PC-7 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 8

An electrophotographic photoconductor was produced in the same manner as in Example 1 except that the PC-8 was used instead of the PC-4 used in Example 1, and then its initial potential ($V_0$), residual potential ($V_R$) after irradiation with light for 5 seconds, half decay exposure ($E_{1/2}$), and amount in

Example 9

An electrophotographic photoconductor was produced in the same manner as in Example 1 except that the PC-9 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 10

An electrophotographic photoconductor was produced in the same manner as in Example 1 except that the PC-10 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 11

An electrophotographic photoconductor was produced in the same manner as in Example 1 except that the PC-11 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 12

An electrophotographic photoconductor was produced in the same manner as in Example 1 except that the PC-12 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 13

An electrophotographic photoconductor was produced in the same manner as in Example 1 except that the PC-13 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 14

An electrophotographic photoconductor was produced in the same manner as in Example 1 except that the PC-14 was used instead of the PC-4 used in Example 1, and then its initial potential ($V_0$), residual potential ($V_R$) after irradiation with light for 5 seconds, half decay exposure ($E_{1/2}$), and amount in

Example 15

An electrophotographic photoconductor was produced in the same manner as in Example 1 except that the PC-15 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 16

An electrophotographic photoconductor was produced in the same manner as in Example 1 except that the PC-16 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 17

An electrophotographic photoconductor was produced in the same manner as in Example 1 except that the PC-17 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 18

An electrophotographic photoconductor was produced in the same manner as in Example 1 except that the PC-18 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 19

An electrophotographic photoconductor was produced in the same manner as in Example 1 except that the PC-19 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 20

An electrophotographic photoconductor was produced in the same manner as in Example 1 except that the PC-20 was used instead of the PC-4 used in Example 1, and then its initial potential ($V_0$), residual potential ($V_R$) after irradiation with light for 5 seconds, half decay exposure ($E_{1/2}$), and amount in which its charge transporting layer reduced owing to wear were measured by the same methods. Table 2 shows the results.

Example 21

An electrophotographic photoconductor was produced in the same manner as in Example 1 except that the PC-21 was used instead of the PC-4 used in Example 1, and then its initial potential ($V_O$), residual potential ($V_R$) after irradiation with light for 5 seconds, half decay exposure ($E_{1/2}$), and amount in which its charge transporting layer reduced owing to wear were measured by the same methods. Table 2 shows the results.

Comparative Example 3

An electrophotographic photoconductor was produced in the same manner as in Example 1 with the following polycarbonate resin (PC-C3) (reduced viscosity: 1.0 dl/g), and then its initial potential ($V_O$), residual potential ($V_R$) after irradiation with light for 5 seconds, half decay exposure ($E_{1/2}$), and amount in which its charge transporting layer reduced owing to wear were measured by the same methods. Table 2 shows the results.

TABLE 1

| | Initial surface potential $V_O$ (V) | Residual potential $V_R$ (V) | Half decay exposure $E_{1/2}$ (lux · sec) | Amount of wear (mg) |
|---|---|---|---|---|
| Example 1 | −743 | −4 | 0.72 | 0.91 |
| Comparative Example 1 | −741 | −4 | 0.74 | 1.43 |
| Comparative Example 2 | −751 | −4 | 0.75 | 1.47 |

TABLE 2

| | Initial surface potential $V_O$ (V) | Residual potential $V_R$ (V) | Half decay exposure $E^{1/2}$ (lux · sec) | Amount of wear (mg) |
|---|---|---|---|---|
| Example 2 | −740 | −3 | 0.72 | 0.65 |
| Example 3 | −754 | −4 | 0.73 | 0.68 |
| Example 4 | −750 | −4 | 0.72 | 0.69 |
| Example 5 | −741 | −4 | 0.73 | 0.7 |
| Example 6 | −739 | −4 | 0.75 | 0.67 |
| Example 7 | −743 | −4 | 0.72 | 0.71 |
| Example 8 | −743 | −4 | 0.72 | 0.7 |
| Example 9 | −747 | −4 | 0.74 | 0.68 |
| Example 10 | −743 | −4 | 0.73 | 0.68 |
| Example 11 | −750 | −4 | 0.73 | 0.76 |
| Example 12 | −739 | −4 | 0.72 | 0.72 |
| Example 13 | −754 | −4 | 0.73 | 0.97 |
| Example 14 | −750 | −4 | 0.72 | 0.89 |
| Example 15 | −744 | −4 | 0.72 | 0.55 |
| Example 16 | −739 | −4 | 0.75 | 0.65 |
| Example 17 | −742 | −4 | 0.75 | 0.72 |
| Example 18 | −743 | −4 | 0.74 | 0.78 |
| Example 19 | −743 | −4 | 0.72 | 0.76 |
| Example 20 | −757 | −4 | 0.72 | 0.68 |
| Example 21 | −740 | −4 | 0.72 | 0.63 |
| Comparative Example 3 | −741 | −4 | 0.74 | 1.67 |

The polycarbonate resin used in Comparative Example 3 is known to be excellent in electrophotographic characteristic. An electrophotographic photoconductor using the urethane-copolymerized PC of the present invention is found to have an excellent electrophotographic characteristic because each example described in Table 2 has an electrophotographic characteristic comparable to that of Comparative Example 3. On the other hand, Comparative Example 3 is poor in wear resistance.

As can be seen from Tables 1 and 2, the urethane-copolymerized polycarbonate resin of the present invention achieves wear resistance high enough to serve as a binder resin for an organic photoconductor because strong hydrogen bonds are obtained at a constant interval as a result of the placement of urethane groups at both terminals of the monomer unit. Although the wear resistance is good as compared even with the wear resistance of a polycarbonate resin having the same primary skeleton, an improving effect on the wear resistance is further exerted in such a state that the photosensitive layer contains an additive such as a CTM.

INDUSTRIAL APPLICABILITY

The urethane-copolymerized PC of the present invention has high wear resistance by skillfully utilizing a strong hydrogen bond between urethane groups. Therefore, the use of the urethane-copolymerized PC can provide an electrophotographic photoconductor having high wear resistance and maintaining an excellent electrophotographic characteristic over a long time period.

The invention claimed is:
1. A urethane-copolymerized polycarbonate resin, comprising:
a repeating unit represented by the following formula [1]; and
a repeating unit represented by the following formula [2]:

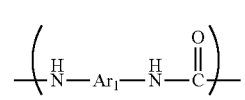

[1]

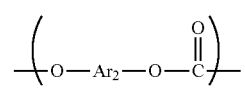

[2]

wherein
$Ar_2$ represents a group having a divalent aromatic group, and
$Ar_1$ represents a group represented by the following formula [3]:

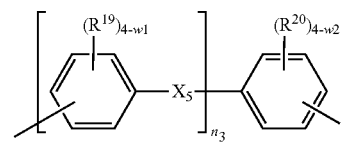

[3]

wherein
$X_5$ represents a single bond, —O—, —CO—, —S—, —SO—, —SO$_2$—, —CONH—, —CR$^{21}$R$^{22}$—, or —O—R$^{23}$—O—;
$R^{21}$ and $R^{22}$ each independently represent a hydrogen atom, an alkyl group having 1 to 12 carbon atoms, a trifluoromethyl group, or a substituted or unsubstituted aryl group having 6 to 12 carbon atoms;
$R^{23}$ represents a carbonyl group, an alkyl chain having 1 to 6 carbon atoms, or a trifluoroalkyl chain, and may include a branched alkyl chain, a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms;

$R^{19}$ and $R^{20}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms;

$w_1$ and $w_2$ each represent an integer of 0 to 4; and a number $n_3$ of repeating units represents 0 to 5;

$R^{19}$'s, $w_1$'s, and $X_5$'s in the repeating units are each capable of being selected for each repeating unit; and when an aromatic ring is substituted with two or more $R^{19}$'s or $R^{20}$'s, the $R^{19}$'s or $R^{20}$'s are capable of representing different substituents.

2. The urethane-copolymerized polycarbonate resin according to claim 1, wherein $Ar_2$ in formula [2] represents a group represented by the following formula [4] and/or the following formula [12]:

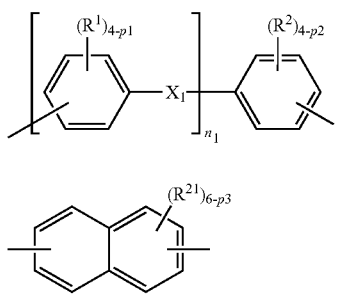

wherein $X_1$ represents a single bond, —O—, —CO—, —S—, —SO—, —SO$_2$—, —CONH—, —CR$^3$R$^4$—, or —O—R$^5$—O—;

$R^3$ and $R^4$ each independently represent a hydrogen atom, an alkyl group having 1 to 12 carbon atoms, a trifluoromethyl group, or a substituted or unsubstituted aryl group having 6 to 12 carbon atoms;

$R^5$ represents a carbonyl group, an alkyl chain having 1 to 6 carbon atoms, or a trifluoroalkyl chain, and may include a branched alkyl chain, a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms;

$R^1$, $R^2$, and $R^{21}$ each represent a halogen atom, a trifluoromethyl group, an alkyl group having 1 or 2 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms;

$p_1$ and $p_2$ each represent an integer of 0 to 4;

$p_3$ represents an integer of 0 to 6; and a number $n_1$ of repeating units represents 0 to 5;

$R^1$'s, $p_1$'s, and $X_1$'s in the repeating units are each capable of being selected for each repeating unit;

when an aromatic ring is substituted with two or more $R^1$'s or $R^2$'s, the $R^1$'s or $R^2$'s are capable of representing different substituents; and when an aromatic ring is substituted with two or more $R^{21}$'s, the $R^{21}$'s are capable of representing different substituents.

3. The urethane-copolymerized polycarbonate resin according to claim 1, wherein $Ar_2$ in formula [2] represents a group represented by any one of the following formulas [5], [6], and [7] and/or the following formula [12]:

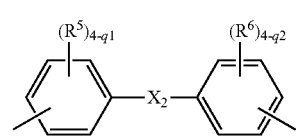

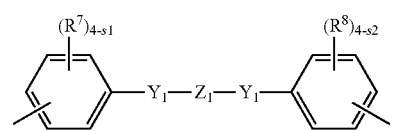

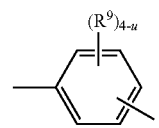

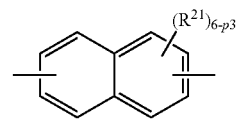

wherein in formula [5], $X_2$ represents a single bond, —O—, —CO—, —S—, —SO—, —SO$_2$—, —CONH—, —CR$^{10}$R$^{11}$—, or —O—R$^{12}$—O—, $R^{10}$ and $R^{11}$ each independently represent a hydrogen atom, an alkyl group having 1 to 12 carbon atoms, a trifluoromethyl group, or a substituted or unsubstituted aryl group having 6 to 12 carbon atoms, and $R^{12}$ represents a carbonyl group, an alkyl chain having 1 to 6 carbon atoms, or a trifluoroalkyl chain, and may include a branched alkyl chain, a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms;

wherein in formula [6], $Y_1$ represents a single bond, —O—, —CO—, —NH—, —S—, —SO—, —SO$_2$—, —CONH—, or —CR$^{13}$R$^{14}$, and $R^{13}$ and $R^{14}$ each independently represent a hydrogen atom, an alkyl group having 1 to 12 carbon atoms, a trifluoromethyl group, or a substituted or unsubstituted aryl group having 6 to 12 carbon atoms, a substituted or unsubstituted cycloalkylidene group having 5 to 12 carbon atoms, or a substituted or unsubstituted adamantane-2,2-diyl or adamantane-1,3-diyl group;

wherein in formulas [5] to [7], $R^5$ to $R^9$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, $q_1$ and $q_2$ each represent an integer of 0 to 4, $s_1$ and $s_2$ each represent an integer of 0 to 4, and u represents an integer of 0 to 4, and when an aromatic ring is substituted with two or more $R^5$'s, $R^6$'s, $R^7$'s, $R^8$'s, or $R^9$'s, the $R^5$'s, $R^6$'s, $R^7$'s, $R^8$'s, or $R^9$'s are capable of representing different substituents;

wherein in formula [6], $Z_1$ is represented by the following formula [6a] or formula [6b]:

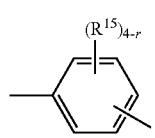

[6a]

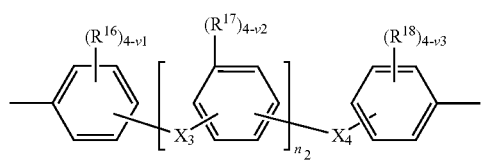

[6b]

wherein in formula [6b], $X_3$ and $X_4$ each represent a single bond, —O—, —CO—, —OC(=O)O—, —S—, —SO—, —SO$_2$—, —CONH—, or —CR$^{19}$R$^{20}$—, and $R^{19}$ and $R^°$ each independently represent a hydrogen atom, an alkyl group having 1 to 12 carbon atoms, a trifluoromethyl group, or a substituted or unsubstituted aryl group having 6 to 12 carbon atoms, a substituted or unsubstituted cycloalkylidene group having 5 to 12 carbon atoms, a substituted or unsubstituted adamantane-2,2-diyl or adamantane-1,3-diyl group, a substituted or unsubstituted α,ω-alkylene group having 2 to 12 carbon atoms, a 9,9-fluorenylidene group, a 1,8-menthanediyl group, a 2,8-menthanediyl group, a substituted or unsubstituted pyrazylidene group, or a substituted or unsubstituted arylene group having 6 to 12 carbon atoms;

wherein in formula [6a] or [6b]:

$R^{15}$ to $R^{18}$ each represent a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, r represents an integer of 0 to 4, $v_1$, $v_2$, and $v_3$ each represent an integer of 0 to 4, a number $n_2$ of repeating units represents 0 to 2, $R^{17}$'s, $X_3$'s, and $v_2$'s in the repeating units are each capable of being selected for each repeating unit, and when an aromatic ring is substituted with two or more $R^{15}$'s, $R^{16}$'s, $R^{17}$'s, or $R^{18}$'s, the $R^{15}$'s, $R^{16}$'s, $R^{17}$'s, or $R^{18}$'s are capable of representing different substituents; and wherein in formula [12]:

$R_{21}$ represents a halogen atom, a trifluoromethyl group, an alkyl group having 1 or 2 carbon atoms, a substituted or unsubstituted aryl group having 6 to 12 carbon atoms, an alkoxy group having 1 to 12 carbon atoms, a substituted or unsubstituted aryloxy group having 6 to 12 carbon atoms, or a substituted or unsubstituted arylalkyl group having 7 to 20 carbon atoms, $p_3$ represents an integer of 0 to 6, and when an aromatic ring is substituted with two or more $R^{21}$'s the $R^{21}$'s are capable of representing different substituents.

4. The urethane-copolymerized polycarbonate resin according to claim 1, wherein Ar$_2$ in formula [2] represents an alkylidenebis(phenylene) group with or without a substituent having 1 to 4 carbon atoms, a cycloalkylidenebis(phenylene) group with or without a substituent having 5 or 6 carbon atoms, a substituted or unsubstituted adamantane-2,2-diylbis(phenylene) group, a substituted or unsubstituted adamantane-1,3-diylbis(phenylene) group, or a substituted or unsubstituted 1,3-phenylenebis[(methylethylidene)phenylene] group, and the groups may each have a substituent on an aromatic ring.

5. The urethane-copolymerized polycarbonate resin according to claim 4, wherein:

the substituent which the group represented by Ar$_2$ may have on the aromatic ring comprises a chlorine atom or a methyl group;

an alkylidene group of the alkylidenebis(phenylene) group with or without a substituent having 1 to 4 carbon atoms comprises a 1,1-diphenylmethylene group, a 1,1-ethylidene group, a 2,2-propylidene group, or a 2,2-hexafluoropropylidene group; and a cycloalkylidene group of the cycloalkylidenebis(phenylene) group with or without a substituent having 5 or 6 carbon atoms comprises a cyclohexylidene group or a 3,3,5-trimethyl-1,1-cyclohexylidene group.

6. The urethane-copolymerized polycarbonate resin according to claim 1, wherein Ar$_1$ in formula [1] represents a diphenylene ether group, a diphenylene sulfone group, a 9,9-bis(phenylene)fluorene group, an α,ω-alkylenebis(phenylene ether) group having 2 to 5 carbon atoms, a biphenylene group, an alkylidenebis(phenylene) group with or without a substituent having 1 to 4 carbon atoms, a cycloalkylidenebis(phenylene) group having 5 or 6 carbon atoms, a 2,2-propylidenebis(diphenylether)-p,p'-diyl group, or a phenylene group, and the groups may each have a substituent on an aromatic ring.

7. The urethane-copolymerized polycarbonate resin according to claim 6, wherein:

the substituent which the group represented by Ar$_1$ may have on the aromatic ring comprises a chlorine atom or a methyl group;

an α,ω-alkylene group of the α,ω-alkylenebis(phenylene ether) group having 2 to 5 carbon atoms comprises an ethylene group, a trimethylene group, or a tetramethylene group;

an alkylidene group of the alkylidenebis(phenylene) group with or without a substituent having 1 to 4 carbon atoms comprises a methylene group, a 2,2-propylidene group, or a 2,2-hexafluoropropylidene group; and a cycloalkylidene group of the cycloalkylidenebis(phenylene) group having 5 or 6 carbon atoms comprises a cyclohexylidene group.

8. The urethane-copolymerized polycarbonate resin according to claim 1, wherein the molar ratio between the repeating unit represented by formula [1] and the repeating unit represented by formula [2] is 1:99 to 50:50.

9. The urethane-copolymerized polycarbonate resin according to claim 1, wherein the resin has a structure in which a part or the entirety of a molecular terminal is sealed with a perfluoroalkyl group, a phenol containing a terminal hydrogen-substituted perfluoroalkyl group, a 1,1-dihydro-1-perfluoroalkyl alcohol, or a 1,1,ω-trihydro-1-perfluoroalkyl alcohol.

10. A resin coating liquid, comprising the urethane-copolymerized polycarbonate resin according to claim 1.

11. An electrophotographic photoconductor, comprising a photosensitive layer provided on a conductive substrate, wherein the urethane-copolymerized polycarbonate resin according to claim 1 is incorporated as a component of the photosensitive layer.

12. The urethane-copolymerized polycarbonate resin according to claim 2, wherein $X_1$ is a single bond, —O—, —SO$_2$—, —CR$^3$R$^4$—, —O—R$^5$—O—, or a 9,9-fluorenylidene group, and $n_1$ is 1 to 3.

13. The urethane-copolymerized polycarbonate resin according to claim 3, wherein $X_2$ is a single bond, —O—, —SO$_2$—, —CR$^3$R$^4$—, or a 9,9-fluorenylidene group, $Y_1$ is —O—, $Z_1$ is represented by formula [6b], $X_4$ is —O— or —CR$^{19}$R$^{20}$—, and $n_2$ is 0.

14. The urethane-copolymerized polycarbonate resin according to claim 1, the substituents for substituted aryl, substituted cycloalkylidene, substituted adamantine-2,2-diyl substituted adamantane-1,3-diyl group, substituted α,ω-alkylene, substituted pyrazylidene, substituted arylene, substituted aryloxy, or substituted arylalkyl are selected from: halogen; alkyl groups each having 1 to 12 carbon atoms; alkoxy groups each having 1 to 12 carbon atoms; aryl groups each having 6 to 12 carbon atoms; and arylalkyl groups each having 7 to 20 carbon atoms.

15. The urethane-copolymerized polycarbonate resin according to claim 2, the substituents for substituted aryl, substituted cycloalkylidene, substituted adamantane-2,2-diyl substituted adamantane-1,3-diyl group, substituted α,ω-alkylene, substituted pyrazylidene, substituted arylene, substituted aryloxy, or substituted arylalkyl are selected from: halogen; alkyl groups each having 1 to 12 carbon atoms; alkoxy groups each having 1 to 12 carbon atoms; aryl groups each having 6 to 12 carbon atoms; and arylalkyl groups each having 7 to 20 carbon atoms.

16. The urethane-copolymerized polycarbonate resin according to claim 3, the substituents for substituted aryl, substituted cycloalkylidene, substituted adamantane-2,2-diyl substituted adamantane-1,3-diyl group, substituted α,ω-alkylene, substituted pyrazylidene, substituted arylene, substituted aryloxy, or substituted arylalkyl are selected from: halogen; alkyl groups each having 1 to 12 carbon atoms; alkoxy groups each having 1 to 12 carbon atoms; aryl groups each having 6 to 12 carbon atoms; and arylalkyl groups each having 7 to 20 carbon atoms.

17. The urethane-copolymerized polycarbonate resin according to claim 1, the ratio of the monomer unit represented by formula [1] to the entire urethane-copolymerized polycarbonate copolymer is 1 to 50 mol %.

18. The urethane-copolymerized polycarbonate resin according to claim 1, the ratio of the monomer unit represented by formula [1] to the entire urethane-copolymerized polycarbonate copolymer is 3 to 30 mol %.

19. The urethane-copolymerized polycarbonate resin according to claim 1, wherein a solution of the urethane-copolymerized polycarbonate resin in methylene chloride as a solvent having a concentration of 0.5 g/dl has a viscosity [η$_{SP}$/C] at 20° C. of 0.1 to 5 dl/g.

20. The urethane-copolymerized polycarbonate resin according to claim 1, wherein a solution of the urethane-copolymerized polycarbonate resin in methylene chloride as a solvent having a concentration of 0.5 g/dl has a viscosity [η$_{SP}$/C] at 20° C. of 0.2 to 3 dl/g.

* * * * *